(12) United States Patent
Hu et al.

(10) Patent No.: US 9,104,770 B2
(45) Date of Patent: Aug. 11, 2015

(54) METHODS FOR QUERY PROCESSING OF TOPOLOGICAL RELATIONSHIPS AMONG COMPLEX SPATIAL OBJECTS

(71) Applicant: Oracle International Corporation, Redwood Shores, CA (US)

(72) Inventors: Ying Hu, Nashua, NH (US); Siva Ravada, Nashua, NH (US); Richard J. Anderson, Nashua, NH (US); Bhuvan Bamba, San Francisco, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 222 days.

(21) Appl. No.: 13/780,990

(22) Filed: Feb. 28, 2013

(65) Prior Publication Data
US 2014/0244635 A1    Aug. 28, 2014

(51) Int. Cl.
*G06F 17/30* (2006.01)
(52) U.S. Cl.
CPC ...... *G06F 17/3087* (2013.01); *G06F 17/30327* (2013.01); *G06F 17/30625* (2013.01); *G06F 17/30831* (2013.01); *G06F 17/30961* (2013.01)
(58) Field of Classification Search
CPC .......... G06F 17/30061; G06F 17/3087; G06F 17/30327; G06F 17/30625; G06F 17/30961
USPC .......................................... 707/724, 796, 797
See application file for complete search history.

(56) References Cited

U.S. PATENT DOCUMENTS

| 5,574,835 | A  | * | 11/1996 | Duluk et al. | 345/421 |
| 7,219,108 | B2 | * | 5/2007  | Kothuri et al. | 707/754 |
| 2005/0203932 | A1 | * | 9/2005  | Kothuri et al. | 707/100 |
| 2005/0222978 | A1 | * | 10/2005 | Drory et al. | 707/3 |
| 2008/0162424 | A1 | * | 7/2008  | Adler | 707/2 |
| 2009/0094010 | A1 | * | 4/2009  | Kothuri et al. | 703/7 |
| 2012/0054195 | A1 | * | 3/2012  | Hu et al. | 707/743 |
| 2012/0166446 | A1 | * | 6/2012  | Bowman et al. | 707/743 |

OTHER PUBLICATIONS

Thomas Brinkhoff et al., "Multi-Step Processing of Spatial Joins", SIGMOD Conference 1994, 12 pgs.
Edward P. F. Chan et al., "A General and Efficient Implementation of Geometric Operators and Predicates", SSD 1997, 27 pgs.
Ying Hu et al., "Geodetic Point-In-Polygon Query Processing in Oracle Spatial", SSTD 2011, 37 pgs.
Ying Hu et al., "Topological Relationship Query Processing for Complex Regions in Oracle Spatial (Industrial Paper)", ACM SIGSPATIAL GIS 2012, 10 pgs.
Dimitris Papadias et al., "Topological Relations in the World of Minimum Bounding Rectangles: A Study with R-trees", SIGMOD Conference 1995, 12 pgs.

* cited by examiner

*Primary Examiner* — Thanh-Ha Dang
(74) *Attorney, Agent, or Firm* — Hickman Palermo Becker Bingham LLP

(57) ABSTRACT

An optimized method of processing queries requesting a description of a spatial relationship between a test geometry and a query geometry, such as points, lines, polygons, and collections thereof, is disclosed. A first part of the method finds a first spatial relationship between a minimum bounding rectangle (MBR) of the test geometry and an In-Memory R-tree (IMR-tree) built to describe the query geometry. If the first relationship does not specify the requested description, then a second part of the method uses the IMR-tree of the query geometry to find a second spatial relationship between the test geometry itself and the query geometry. Optimizations are applied to the first part and to the second part. Optimizations in the second part depend on the test geometry.

54 Claims, 24 Drawing Sheets

| RELATIONSHIP | $A\ (query) \begin{bmatrix} bb & ib & eb \\ bi & ii & ei \\ be & ie & ee \end{bmatrix}$ B (test) | |  | |
|---|---|---|---|---|
| DISJOINT | $\begin{bmatrix} 0 & 0 & * \\ 0 & 0 & * \\ * & * & * \end{bmatrix}$ | | | In the 9-intersection matrix, the first letter indicates a property of the test geometry B and the second letter indicates a property of the query geometry A. |
| DISJOINT | $\begin{bmatrix} 0 & 0 & * \\ 0 & 0 & * \\ * & * & * \end{bmatrix}$ | | | The interior and boundary of A do not intersect the interior and boundary of B. |
| TOUCH | $\begin{bmatrix} 1 & * & * \\ * & 0 & * \\ * & * & * \end{bmatrix}$ or | $\begin{bmatrix} * & 1 & * \\ * & 0 & * \\ * & * & * \end{bmatrix}$ or | $\begin{bmatrix} * & * & * \\ 1 & 0 & * \\ * & * & * \end{bmatrix}$ | The boundaries intersect; or The interior of one intersects the boundary the other, but the interiors do not intersect. |
| ON (B is on A) | $\begin{bmatrix} * & 1 & * \\ 0 & 0 & 1 \\ 0 & 0 & * \end{bmatrix}$ | | | Only the interior and boundary of B intersect the boundary of A. |
| OVERLAPBDYDISJOINT | $\begin{bmatrix} 0 & * & * \\ * & 1 & 1 \\ * & 1 & * \end{bmatrix}$ | | | The boundary of A and B do not intersect. The interior of A and B intersect. The exterior of B intersects the interior of A. The interior of B intersects the exterior of A |
| OVERLAPBDYINTERSECT | $\begin{bmatrix} 1 & * & * \\ * & 1 & 1 \\ * & 1 & * \end{bmatrix}$ | | | The boundaries intersect. The interiors intersect. The exterior of B intersects the interior of A. The interior of B intersects the exterior of A. |
| EQUAL | $\begin{bmatrix} * & 0 & 0 \\ 0 & 1 & 0 \\ 0 & 0 & * \end{bmatrix}$ | | | When the boundaries are NULL, only the interiors intersect. When the boundaries are not NULL, only the boundaries intersect and only the interiors intersect. |
| CONTAINS (B contains A) | $\begin{bmatrix} 0 & * & 0 \\ 0 & 1 & 0 \\ * & 1 & * \end{bmatrix}$ | | | The interiors intersect. The interior of B intersects the exterior of A. The boundary of B does not intersect the boundary or the interior of A. The exterior of B does not intersect the boundary or the interior of A. |
| INSIDE (B inside A) | $\begin{bmatrix} 0 & 0 & * \\ * & 1 & 1 \\ 0 & 0 & * \end{bmatrix}$ | | | The interiors intersect. The exterior of B intersects the interior of A. The boundary of B does not intersect the boundary or the exterior of A. The interior of B does not intersect the boundary or the exterior of A. |
| COVERS (B covers A) | $\begin{bmatrix} * & * & 0 \\ 1 & 1 & 0 \\ * & 1 & * \end{bmatrix}$ or | $\begin{bmatrix} 1 & * & 0 \\ * & 1 & 0 \\ * & 1 & * \end{bmatrix}$ | | The interiors intersect. The boundary of B intersects the interior or the boundary of A. The interior of B intersects the exterior of A. The exterior of B does not intersect the boundary or interior of A. |
| COVERDBY (B is covered by A) | $\begin{bmatrix} * & 1 & * \\ * & 1 & 1 \\ 0 & 0 & * \end{bmatrix}$ or | $\begin{bmatrix} 1 & * & * \\ * & 1 & 1 \\ 0 & 0 & * \end{bmatrix}$ | | The interiors intersect. The interior or the boundary of B intersects the boundary of A. The exterior of B intersects the interior of A. The boundary of B does not intersect the exterior of A. The interior of B does not intersect the exterior of A. |
| ANYINTERACT | $\begin{bmatrix} 1 & * & * \\ * & * & * \\ * & * & * \end{bmatrix}$ or $\begin{bmatrix} * & 1 & * \\ * & * & * \\ * & * & * \end{bmatrix}$ or $\begin{bmatrix} * & * & * \\ 1 & * & * \\ * & * & * \end{bmatrix}$ or $\begin{bmatrix} * & * & * \\ * & 1 & * \\ * & * & * \end{bmatrix}$ | | | The boundaries intersect; or The interior of B intersects the boundary of A; or The boundary of B intersects the interior of A; or The interiors intersect. |

FIG. 1

METHODS FOR QUERY PROCESSING OF TOPOLOGICAL RELATIONSHIPS AMONG COMPLEX SPATIAL OBJECTS

FIELD OF THE INVENTION

The present invention generally relates to spatial query systems and geographical information systems and more particularly to topological query processing.

BACKGROUND

Spatial database systems operate to provide storage and processing of spatial objects. One special type of spatial database system is a geographical information system (GIS), which is configured to store and operate on geo spatial data, i.e., data relating to features on the Earth's surface One useful operation on spatial data is to determine a topological relationship between spatial objects. Most of the topological relationships between spatial objects are expressible in terms of intersections of a boundary, an interior, and an exterior of one spatial object with a boundary, interior and exterior of another spatial object. For example, the topological relationship of 'B inside A' means that the interiors of objects A and B intersect and the exterior of object B intersects the interior of object A, but the boundary of object B does not intersect the boundary or the exterior of object A and the interior of object B does not intersect the boundary or the exterior of object A.

Performing these topological relationship queries quickly is one of the most important aspects of GIS and spatial database systems. A typical query could be one that requests the relationships between a query object such as a complex polygon and a large number of test objects. The query object, a complex polygon with thousands of line segments, could represent one of over a 1000 local regions within the U.S. and the test objects could represent the approximately 1 million highway segments in the U.S. This query could be performed by using a vertical line to sweep from left to right, intersecting the highway line segments of the test objects. However, a sweep line based algorithm can perform poorly for at least two reasons: (1) the very large number of test geometries; and (2) the complexity of test geometries and query geometries.

When there are a large number of test geometries, a system can organize test geometries using a spatial index to improve query performance. A filtering step uses the spatial index to return a candidate set and a refinement step determines the precise relationships for the objects in the candidate set.

When the complexity of the test geometries or query geometries is high, interior approximations and TR*-tree can help improve performance. Interior approximation determines whether a point or a minimum bounding rectangle (MBR) is inside an interior tile of a tessellated query polygon. The TR*-tree decomposes polygons into trapezoids and builds an R*-tree on these trapezoids to improve performance of an INTERSECTS operation.

Additionally, different types of test geometries such as multi-point, line, multi-line, polygon and multi-polygon pose challenges for topological queries against query polygons.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An embodiment implements queries to discover topological relationships between spatial objects using In-Memory R-tree (IMR-tree) techniques. The embodiment supports polygons, points, lines, and collections of points, lines and polygons. Further, it supports the processing of non-geodetic as well as geodetic 2D geometries. The embodiment uses IMR-Tree techniques in a filtering step in which some relationships can be completely determined using certain optimizations. The embodiment uses IMR-Tree techniques in a refining step, in which some relationships, not completely determined in the filtering step, can be determined using certain optimizations. Because the IMR-Tree techniques are used in both the filtering and refining steps, query performance is significantly improved without user tuning. In one embodiment, the time to answer the query is reduced by approximately a factor of 15 relative to the query without the IMR-tree filtering and refining steps and their optimizations.

One method in accordance with an embodiment is a method for processing queries of spatial objects. The method includes receiving a query requesting a description of a spatial relationship between a query polygon and a test object, obtaining the query polygon formed from a plurality of line segments, where the query polygon has a boundary, an interior, and an exterior, obtaining a minimum bounding box (MBR) containing the test object, the test object having one or more features including one or more of a boundary, an exterior, or an interior, obtaining an In-Memory R-tree (IMR-tree) for accessing one or more bounding boxes of the query polygon, where each bounding box contains a particular group of line segments of the query polygon, determining a first spatial relationship between the MBR of the test object and the query polygon by searching the IMR-tree with the MBR of the test object, adjusting values in a 9-intersection matrix to describe the first spatial relationship, where the values of the matrix describe intersections of any features of the test object with the boundary, the interior, or the exterior of the query polygon. If the first spatial relationship does not specify the requested description, the method includes determining a second spatial relationship between the test object and the query polygon by searching the IMR-tree using one or more features of the test object, adjusting the values in the 9-intersection matrix to describe the second spatial relationship. The method further includes returning the adjusted 9-intersection matrix as an answer to the query.

Another method in accordance with an embodiment includes receiving a query requesting a description of a spatial relationship between a query line and a test object, obtaining the query line formed from a plurality of line segments, where the query line has a boundary, an interior, and an exterior, obtaining a minimum bounding box (MBR) containing the test object, the test object having one or more features including one or more of a boundary, exterior, or interior, obtaining an In-Memory R-tree (IMR-tree) for accessing one or more bounding boxes of the query line, where each bounding box contains a particular group of line segments of the query line, determining a first spatial relationship between the MBR of the test object and the query line by searching the IMR-tree with the MBR of the test object, adjusting values in a 9-intersection matrix to capture the first spatial relationship, wherein the values of the matrix describe intersections of any features of the test object with the boundary, the interior, or the exterior of the query line. If the first spatial relationship does not specify the requested description, the method includes determining a second spatial relationship between the test object and the query line by searching the IMR-tree using the test object, adjusting values in the 9-intersection matrix to capture the second spatial relationship. The method further includes returning the adjusted 9-intersection matrix as an answer to the query.

BRIEF DESCRIPTION OF THE DRAWINGS

In the drawings:

FIG. 1 depicts various possible topological relations between two objects;

DESCRIPTION

Figure 2A:
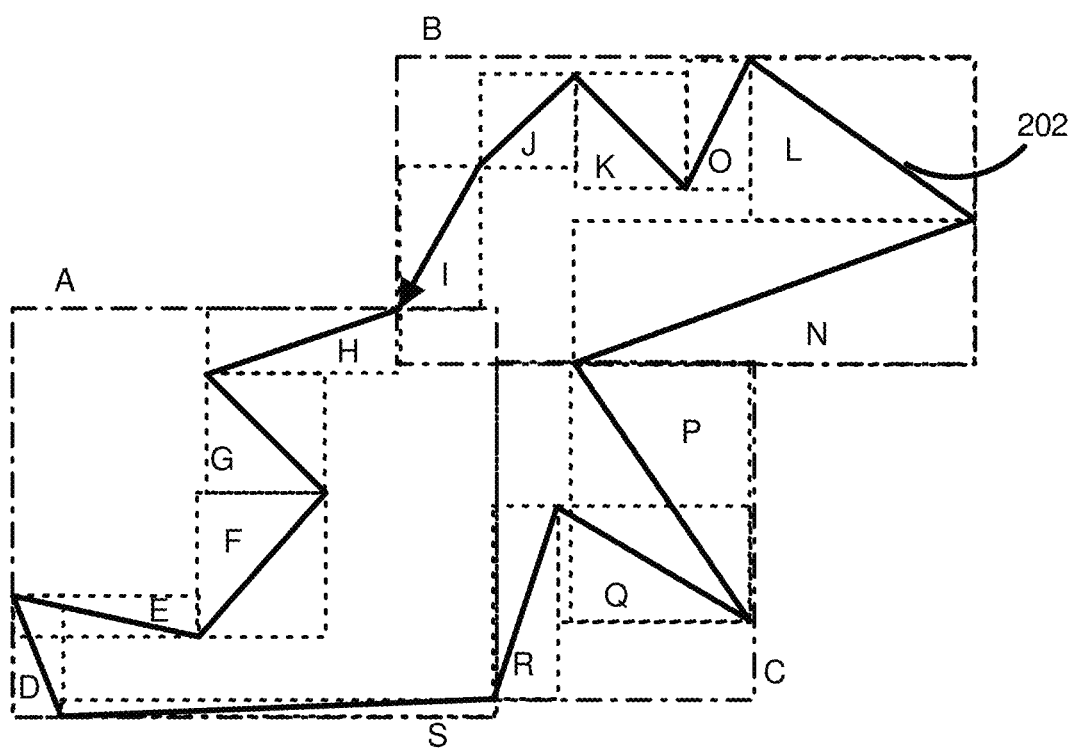
FIG. 2A depicts a query polygon with bounding boxes.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The following conventions apply to points, lines, polygons, and query collections. A point or multi-point is a 0-dimensional geometry and its boundary is null.

A line segment is considered to be a 1-dimensional geometry and the boundaries of the line segment are its endpoints. A multi-line segment is also considered a 1-dimensional geometry whose boundaries are the endpoints of the multi-line segment. In the convention adopted herein, a line segment or a multi-line can be self-crossing. When a line or multi-line crosses itself, an additional convention is adopted to determine boundaries of the line or multi-line. The additional convention is that if endpoints touch any point of the line or multi-line, they are considered interior points and not boundaries.

A polygon and a multi-polygon are 2-dimensional geometries and restrictions are imposed on these geometries. The restrictions include that: a polygon or multi-polygon (1) cannot be self-crossing; (2) must be oriented correctly; and (3) has interiors that are connected, meaning that any two points between interiors can be joined by a path within the polygon or multi-polygon. Correct orientation means that exterior ring boundaries have a counter-clockwise orientation and interior ring boundaries have a clockwise orientation. These rules permit the system to determine whether a point or a line resides inside or outside of query polygon locally.

A query collection is a collection of polygons, points, or lines, where the polygons are not self-crossing, and the points and lines are not on or inside the polygons. When an end point of a line in a collection touches a polygon in a collection, the point is an interior point.

The table in FIG. 1 sets out a basic set of topological relations between two objects A and B, based on their boundaries, interiors, and exteriors. The relations include DISJOINT, TOUCH, ON, OVERLAPBDYDISJOINT, OVERLAPBDYINTERSECT, EQUAL, CONTAINS, INSIDE, COVERS, COVEREDBY, and ANYINTERACT. For example, the relation ON requires that only the interior of object B intersect the boundary of A and the exterior of B intersect the interior of A.

FIG. 1 also sets out the values of a 9-intersection matrix, which captures the relationships listed above. The 9-intersection matrix as used herein describes the values (null=0, not null=1) of all possible intersections of the interior, boundary, and exterior of a first object with the interior, boundary, and exterior of a second object. The columns of the matrix relate to the first object and the rows of the matrix relate to the second object. Thus, the following matrix equation $$\begin{bmatrix} bb & ib & eb \\ bi & ii & ei \\ be & ie & ee \end{bmatrix} = \begin{bmatrix} * & 1 & * \\ 0 & 0 & 1 \\ 0 & 0 & * \end{bmatrix} \quad (1)$$

is equivalent to nine equations, one for each row and column position in the matrix. Matrix equation (1) is equivalent to bb=*, ib=1, eb=*, bi=0, ii=0, ei=1, be=0, ie=0 and ee=*. This means that the interior of the first object intersects the boundary of the second object; the exterior of the first object intersects the interior of the second object; and the remaining intersections are null or don't care. In this example, the value of the matrix describes the relationship of "ON."

In-Memory R-Tree (IMR-Tree)

Figure 2B:
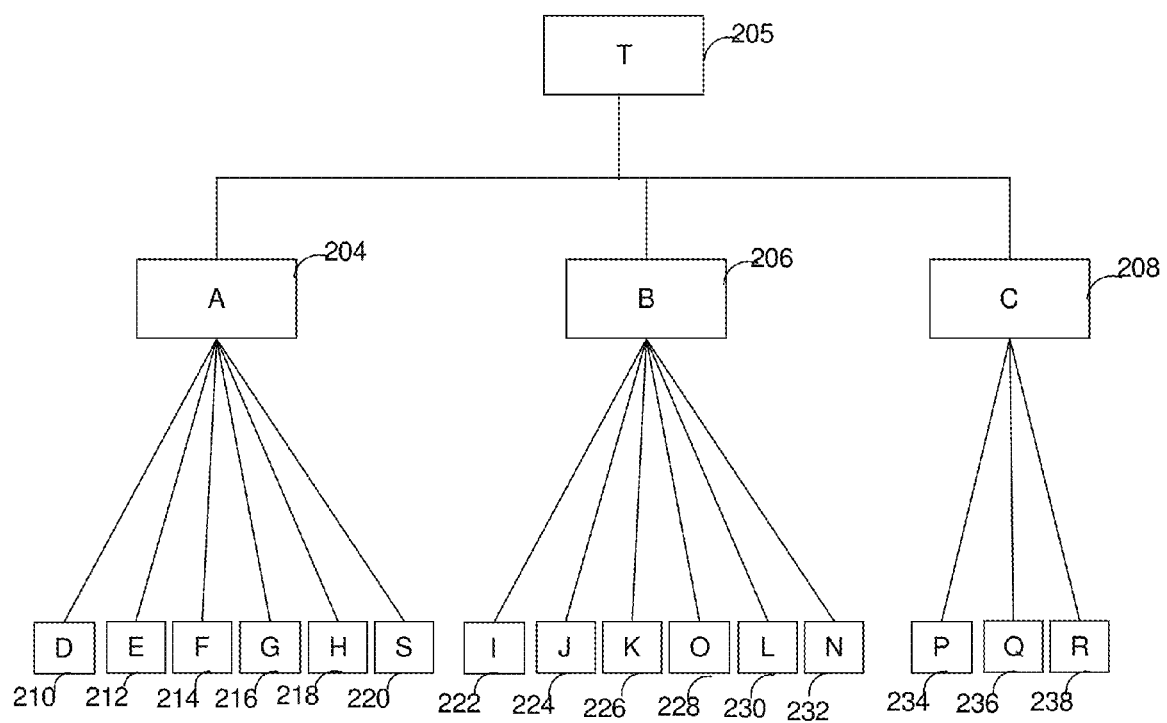
FIG. 2B depicts an In Memory R-tree (IMR-tree) for the query polygon in FIG. 2A.

Embodiments use an IMR-Tree to represent the query polygon. FIG. 2B depicts an IMR-tree for an example query polygon depicted in FIG. 2A. As the figure shows, an IMR-tree is built from the boundary line segments of a query polygon as shown in FIG. 2A. This technique improves processing speed and makes it easy to extend the technique to geodetic polygons, such as geocentric 3D surfaces. It also makes it easy to include other query geometries such as query points, query lines, and collections of query point, query lines, and query polygons. It is assumed that an IMR-tree is built on a query polygon, unless otherwise stated.

In figure FIG. 2A, the query polygon has 15 line segments. Each line segment is used to delimit a minimum bounding rectangle (MBR), the line segment being the diagonal of the rectangle. This results in 15 MBRs labeled D, E, F, G, H, I, J, K, L, N, O, P, Q, R, S in the figure. The MBRs are advantageously organized as nodes in an in-memory R-tree (IMR-Tree). In the figure, node T represents the entire query polygon, and boxes 204-238 are nodes in the IMR-Tree. Node A is a node that contains descendent nodes D, E, F, G, H, and S. Node B is a node that contains descendent nodes I, J, K, O, L, and N. Node C is a node that contains descendent nodes P, Q, and R. Thus, each intermediate node represents the MBRs of multiple query polygon line segments. Building the IMR-Tree for the query polygon is an infrequent operation so that the cost of building the IMR-Tree is amortized over a large number of queries using the query polygon.

Overview

Figure 3A:
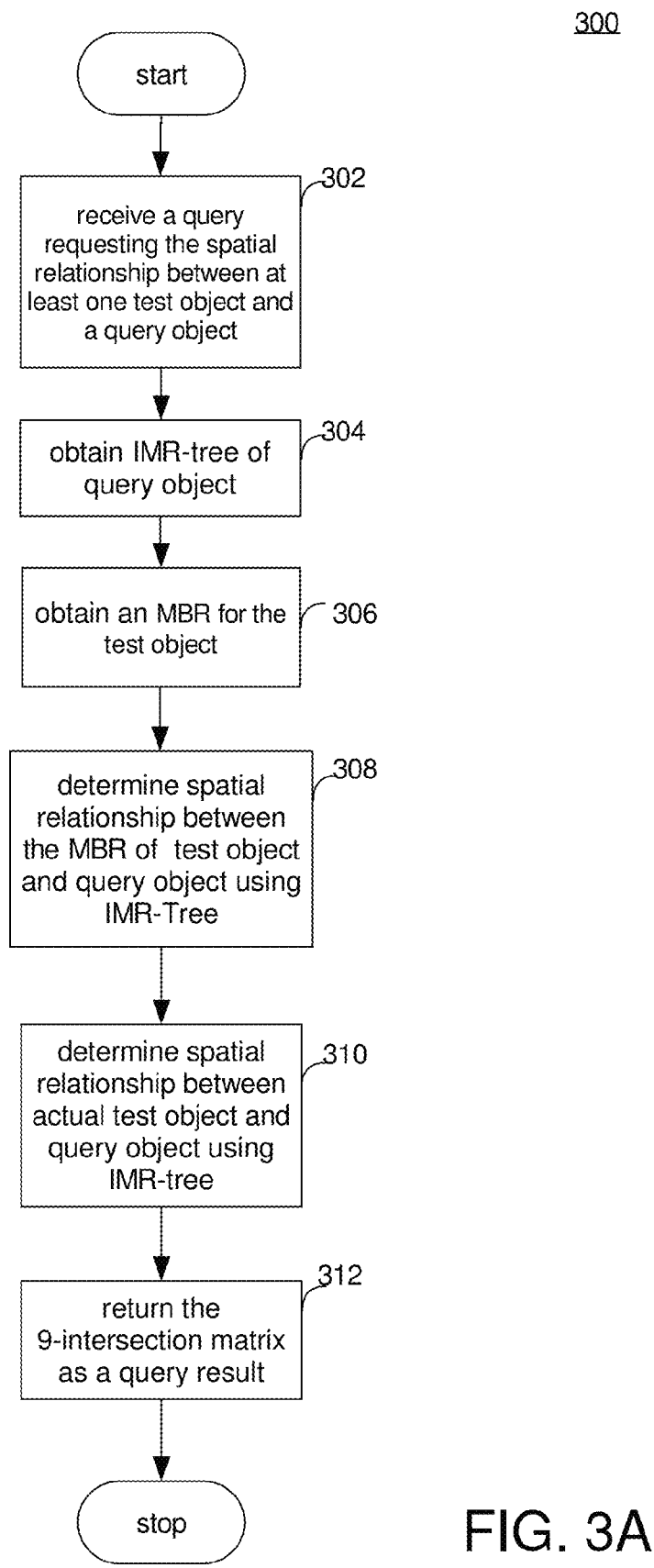
FIGS. 3A-3D depict a flow chart for an embodiment.

Referring to FIG. 3A, an embodiment performs the steps depicted to determine the spatial relationship between one of a plurality of test objects and a query object. The test objects are preferably arranged in an R-tree index for MBRs of the test objects to facilitate access to the MBRs. The R-tree for test objects thus includes leaf and non-leaf node MBRs. The non-leaf nodes include the MBRs of one or more descendent nodes. The leaf node MBRs are the terminal nodes in the R-tree.

In step 302, the system receives a query that requests a description of the relationship between at least one of the test objects and a given query object. In step 304, the system builds an IMR-tree on the query object if one is not already built or obtains an already built IMR-tree for the query object, as described above. In step 306, the system accesses the R-tree spatial index for the test objects to obtain the MBR for the test object. In step 308, the system determines a first spatial relationship between the test object and the query object using the MBR for the test object and the IMR-tree for the query object. Being based on the relationship between the query object and the MBR for the test object, this step acts as a filtering step, because, in some circumstances, depending on the particular relationship, a relationship is resolved without further processing. In step 310, the system determines a second spatial relationship between the test object itself and the query object using the IMR-tree. Being based on the relationship between the test object itself and the query object, this step resolves the relationship between the two that the filtering step did not. In step 312, the system returns the value of the 9-intersection matrix as a query result.

Figure 3B:
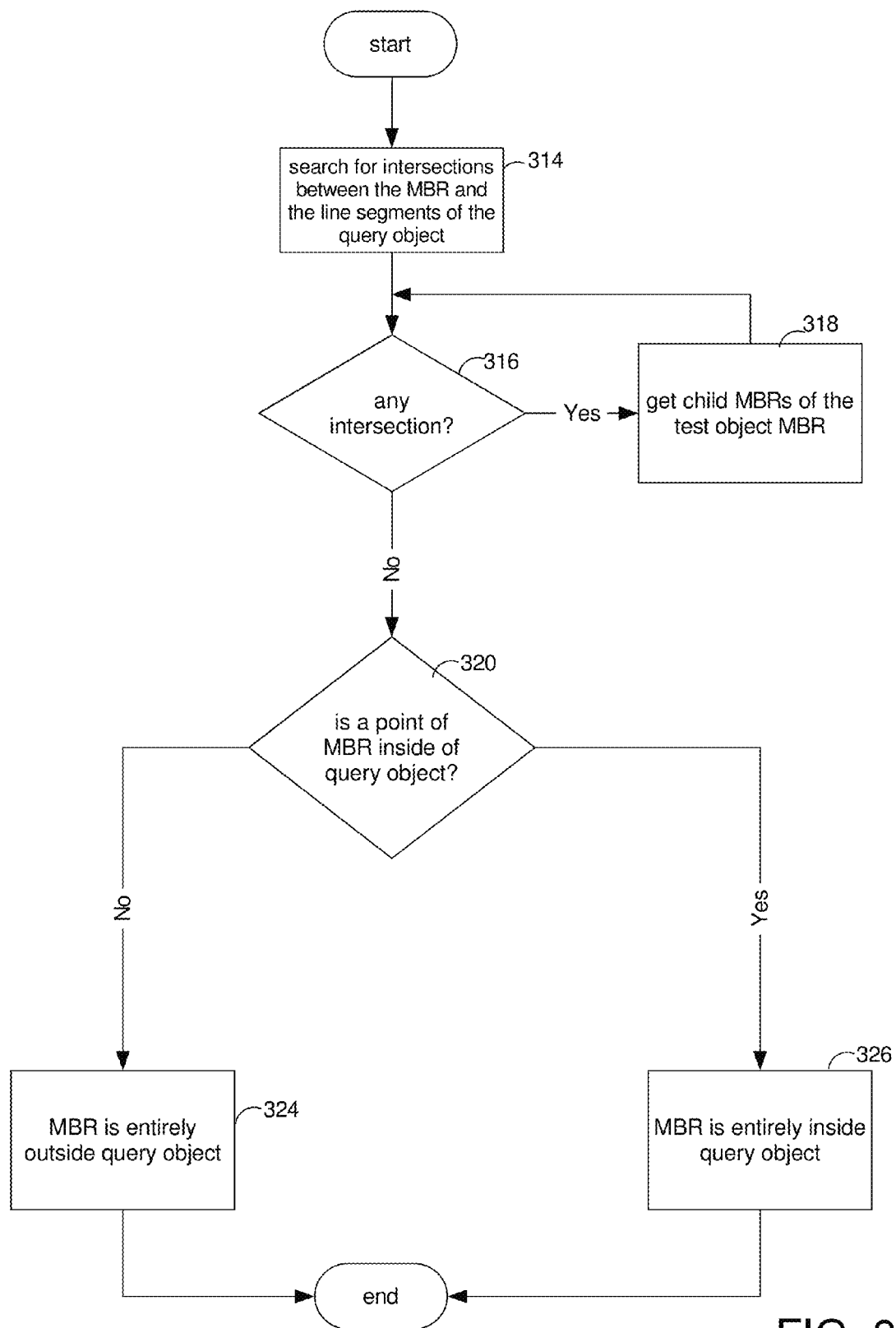
Figure 3C:
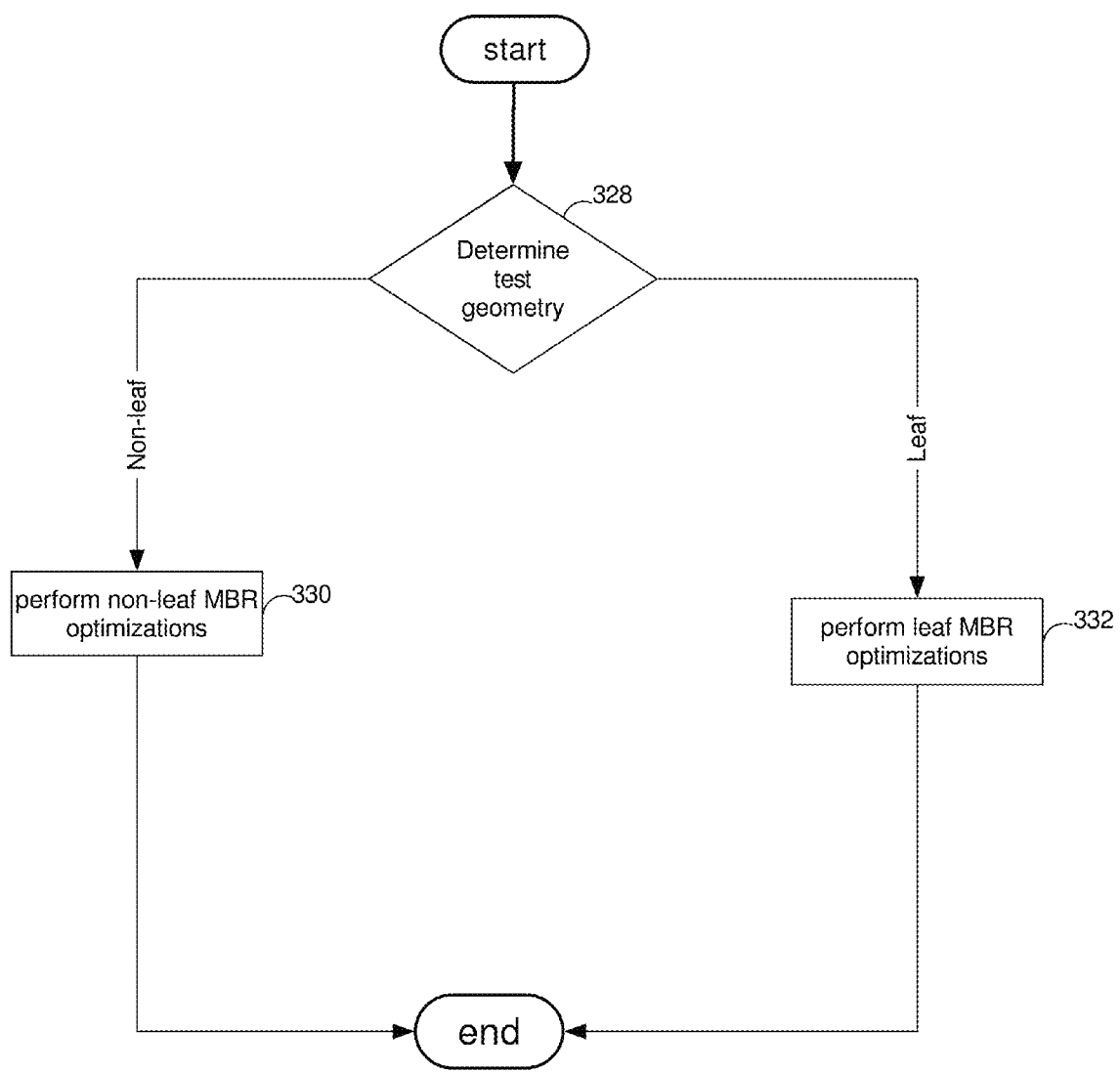

FIGS. 3B and 3C depict step 308 in more detail. Step 308 determines the first spatial relationship between the test object and the query object, such as a query polygon, by first discovering whether the MBR of the test object, intersects, or is entirely inside or entirely outside the query object. In step 314 of FIG. 3B, the system searches for intersections between a current MBR for the test object and the line segments of the query object. If there is an intersection as determined in step 316, then each child MBR of the MBR is obtained, in step 318, as the current MBR and checked for intersections. If there is no intersection for the current MBR as determined in step 316, then the system determines in step 320 if a point of the MBR is inside the query object. If so, then the MBR is determined in step 326 to be entirely inside the query object. Otherwise, it is determined in step 326 to be entirely outside, and there is no need to consider the MBR or its descendants any further.

One technique for determining that a point of the MBR is inside the query object is to select a point, such as the top-right corner of the MBR, construct a line segment from the right-top corner of the MBR to the largest x-value of the query object, and then search the IMR-Tree of the query object to find the number of line segments of the query object that intersect the constructed line segment. If the number of intersections is odd, then the top-right corner of the MBR is inside the query object. Another technique determines the point on the query object that is closest to the right-top corner point of the MBR and then determines if the right-top corner point is inside the query object.

FIG. 3C depicts additional processing that occurs in step 308 of FIG. 3A either concurrently or sequentially. In step 328, the system determines whether the test geometry MBR is a leaf or non-leaf node in the spatial R-tree for the test geometry. If, as determined in step 328, the test geometry MBR is a non-leaf MBR, then the system performs non-leaf MBR optimizations in step 330. If, as determined in step 328, the system determines that the test geometry MBR is a leaf MBR, then the system performs leaf optimizations in step 332.

Figure 3D:
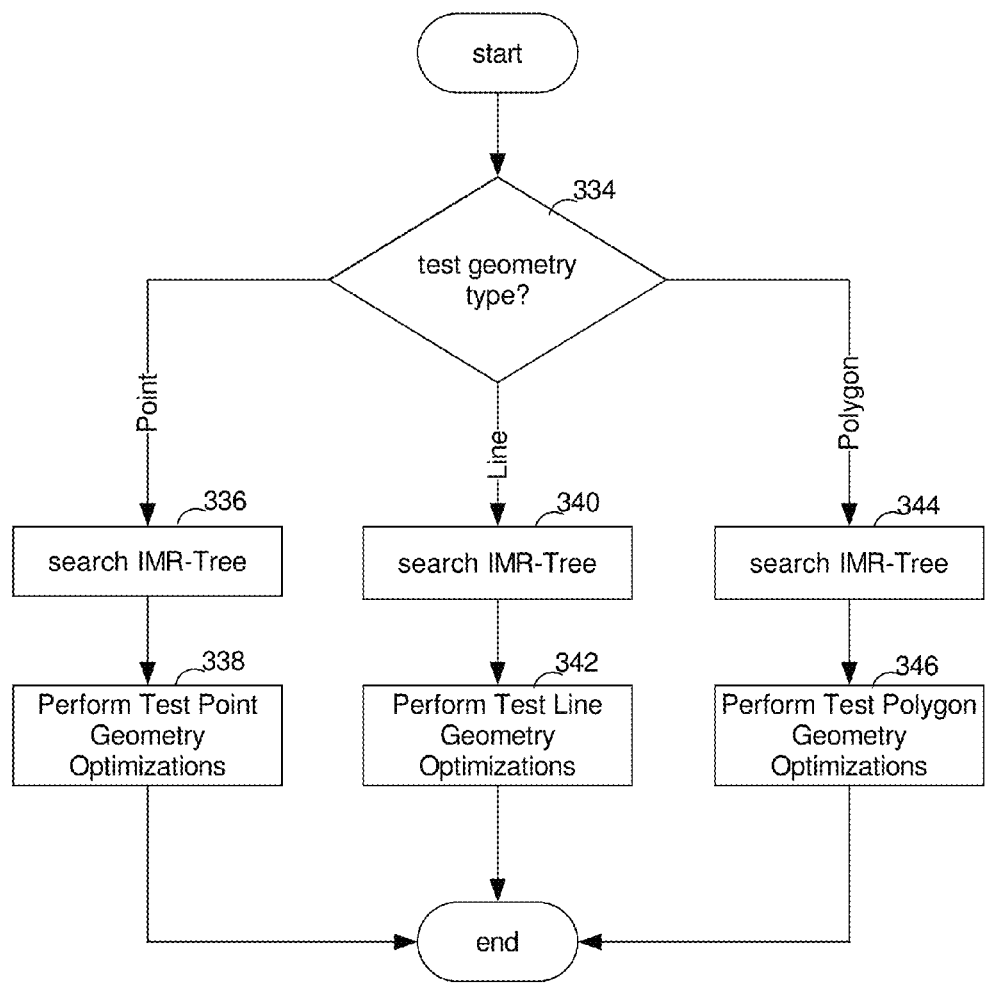

FIG. 3D depicts step 310 in more detail. Step 310 determines the second spatial relationship between the test object and the query object by searching the IMR-tree and performing certain optimizations, depending on the type of test object.

Query Polygons

A. MBR Optimizations

The IMR-tree for the query polygon enables the system to quickly determine whether a leaf or non-leaf MBR node of the test geometry is inside, intersects, or is outside the query polygon. In addition, the following optimizations help speed up the process and apply to all relationships except CONTAINS, COVERS, and EQUAL. For example, if the MBR of the test geometry contains the MBR of the query polygon, then the MBR of the test geometry contains the entire query polygon itself.

MBR is Non-Leaf Node (i.e., the MBR has Descendent Nodes)

The IMR-tree for the query polygon permits quick determination of whether the non-leaf MBR is inside, intersects, or is outside the query polygon, along with the following optimizations, depicted as step 330 in FIG. 3C.

Figure 4A:
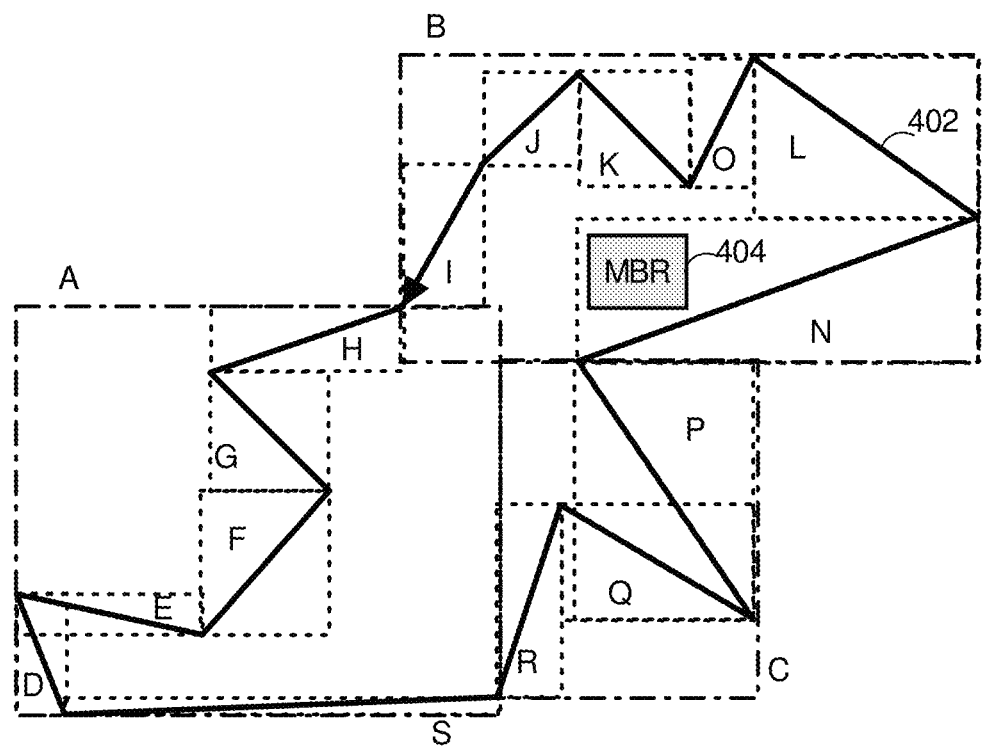
FIG. 4A depicts an MBR for a test object completely inside a query polygon.

FIG. 4A depicts an MBR 404 for a test object that is completely inside a query polygon 402. For the ANYINTERACT and INSIDE relationships, if MBR 404 is a non-leaf MBR and is completely inside the query polygon 402, descendent test geometries of the MBR 404 need no further checking, as they too are inside the query polygon.

Figure 4B:
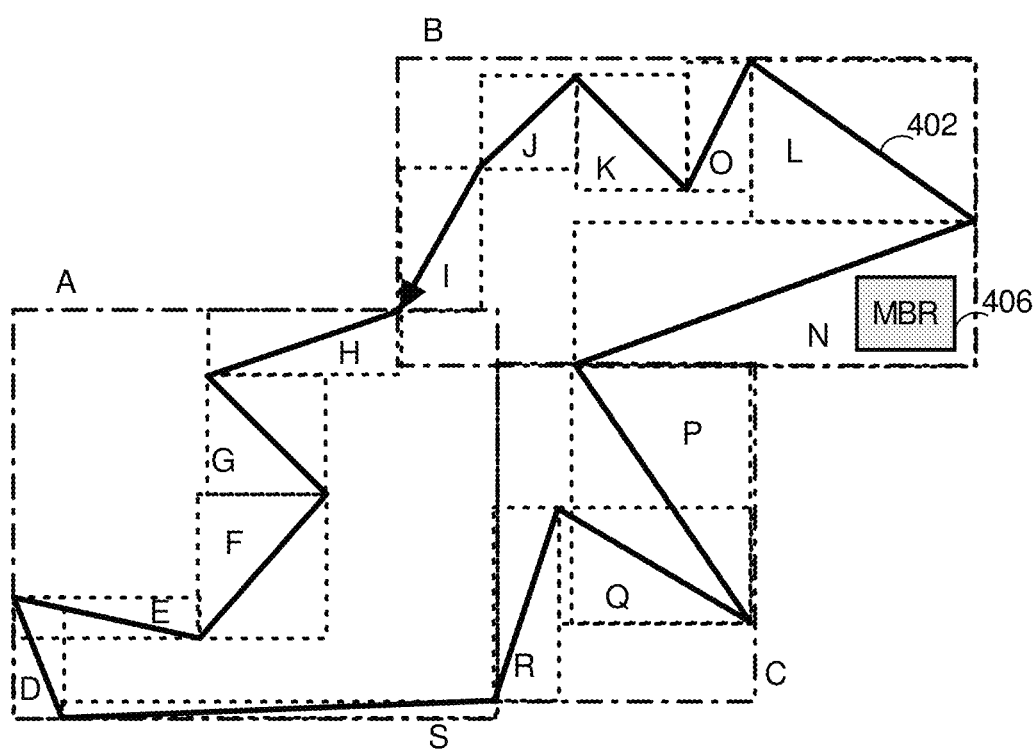
FIG. 4B depicts an MBR for a test object completely outside a query polygon.

FIG. 4B depicts an MBR for a test object that is completely outside a query polygon 402. For all relationships except DISJOINT, if MBR 406 is a non-leaf MBR and is outside the query polygon, descendent test geometries of the MBR 406 need no further checking, as they too are outside the query polygon 402.

For the COVERDBY, ON, OVERLAPBDYDISJOINT, OVERLAPBDYINTERSECT, and TOUCH relationships, if MBR 404, 406 do not intersect the query polygon ring 402, as in FIGS. 4A and 4B, descendent test geometries of the MBR 404, 406 need no further processing, as they too do not intersect the query polygon ring.

MBR is Leaf Node

For the ANYINTERACT and INSIDE relationships, if MBR 404 is a leaf MBR and is inside the query polygon 402 as in FIG. 4A, the test geometry needs no further processing, because the relationship is already defined by the MBR 404. Leaf optimizations are depicted as step 332 in FIG. 3C.

For all relationships except DISJOINT, if MBR 406 is a leaf MBR and is outside the query polygon 402 as in FIG. 4B, the test geometry needs no further processing, because the relationship is already defined by the MBR 406.

For the COVERDBY, ON, OVERLAPBDYDISJOINT, OVERLAPBDYINTERSECT, and TOUCH relationships, if MBR is a leaf MBR and does not intersect the query polygon ring, as in FIGS. 4A and 4B, the test geometry needs no further processing, because the relationship is already defined by the MBR 404, 406.

Figure 4C:
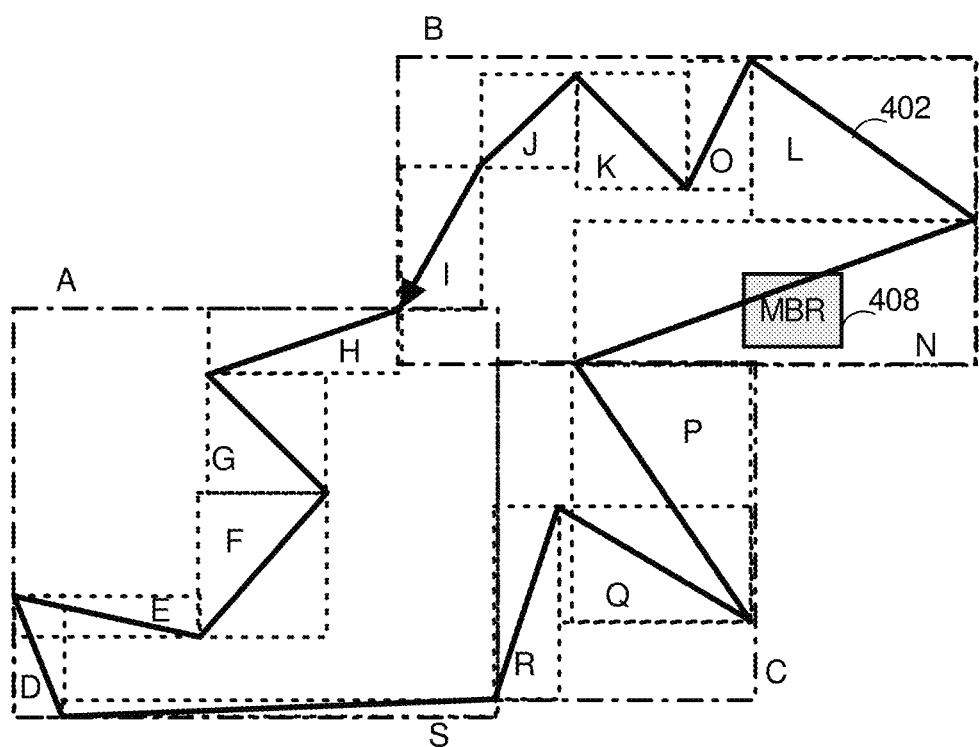
FIG. 4C depicts an MBR for a test object that intersects a query polygon and has a right edge completely outside the query polygon.

Referring to FIG. 4C, if MBR 408 is a leaf MBR and intersects a query polygon 402, additional optimizations can be performed to quickly determine the relationship.

For the COVERDBY, INSIDE, and ON relationships, if any of the four boundary edges of the MBR 408 is outside the query polygon 402, as in FIG. 4C, the test geometry needs no further processing. In FIG. 4C, the right boundary edge of the MBR 408 is totally outside the query polygon 402, so the relationship between the test geometry itself and the query polygon cannot be COVERED, INSIDE, or ON.

Figure 4D:
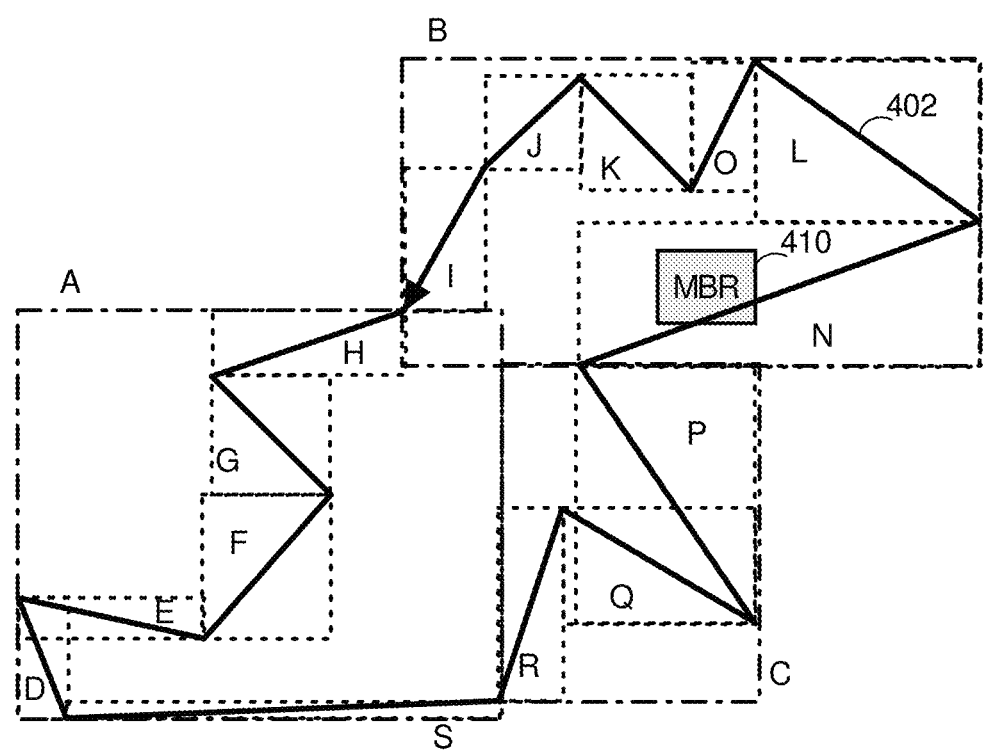
FIG. 4D depicts an MBR for a test object that intersects a query polygon and has a left edge completely inside the query polygon.

For the ON and TOUCH relationships, if MBR 410 is a leaf MBR and if any of the four boundary edges of the MBR 410 are inside the query polygon 402, as in FIG. 4D, the test geometry needs no further processing. In FIG. 4D, the left boundary edge is totally inside the query polygon 402, so the relationship between the test geometry itself and the query polygon 402 cannot be ON or TOUCH.

For the ANYINTERACT relationship, if any of the four boundary edges is inside the query polygon 402, the test geometry needs no further processing. In FIG. 4D, because the left boundary edge of the MBR is totally inside the query polygon 402, the included test geometry must intersect the query polygon 402, so ANYINTERACT must be true.

B. Test Geometry Optimizations

The above filtering and MBR optimizations discard some test geometries from further consideration. The remaining test geometries require further processing. Further optimizations are possible according to whether the test geometry is a point, line, or polygon, as depicted in FIG. 3D. If the test geometry is a point, then test point geometry optimizations are performed in step 338. If the test geometry is a line, then line geometry optimizations are performed in step 342. If the test geometry is a polygon, then polygon geometry optimizations are performed in step 346.

Test Point Geometry Optimizations

Figure 5:
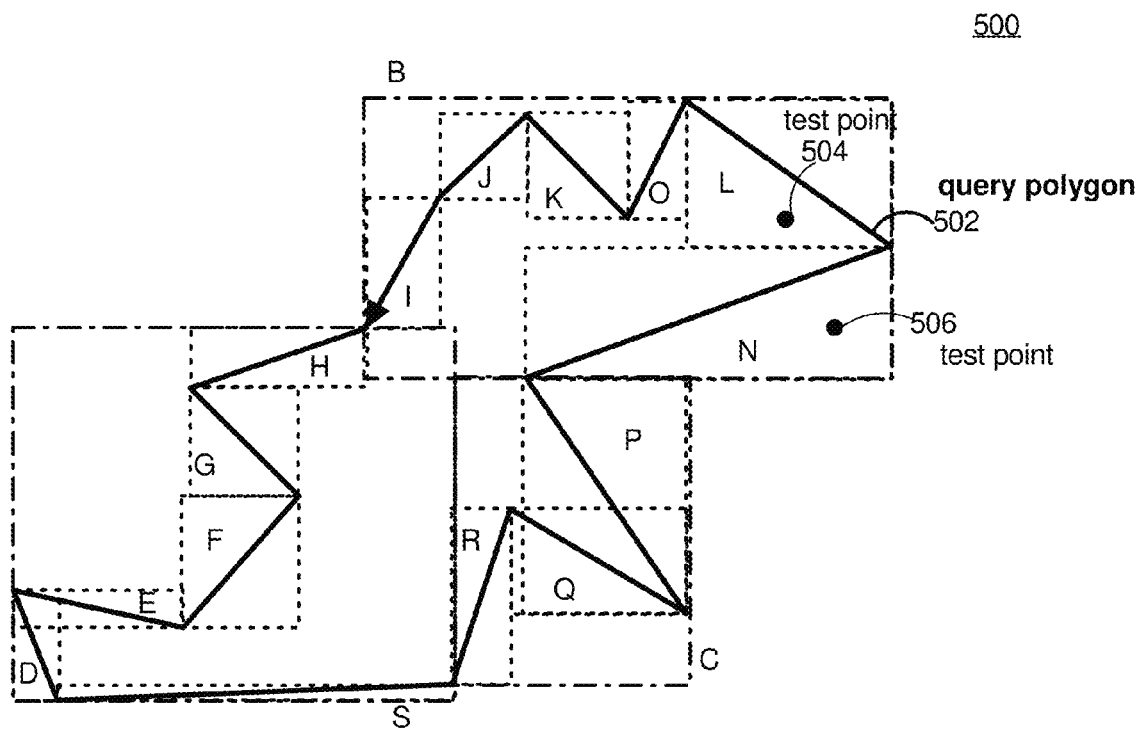
FIG. 5 depicts an example relationship between test points and a query polygon.

FIG. 5 depicts an example relationship between test points 504, 506, and a query polygon 502. In FIG. 5, the single points 504, 506 are 0-dimensional, having a null boundary, so it is possible to simplify the 9-intersection matrix by ignoring certain values because they are fixed. In the matrix equation, $$\begin{bmatrix} bb & ib & eb \\ bi & ii & ei \\ be & ie & ee \end{bmatrix} = \begin{bmatrix} 0 & ib & 1 \\ 0 & ii & 1 \\ 0 & ie & 1 \end{bmatrix},$$

only the middle column carries the needed information. Six cases can be distinguished, three corresponding individual values being set (the test point is either on the boundary, inside, or outside of the query polygon) and the remaining cases depending on combinations of those values. In FIG. 5, test point 504 is inside the query polygon 502 and the test point 506 is outside the query polygon 502. Note that ANYINTERACT means any topological relationship except DISJOINT.

| | |
|---|---|
| ON | Only ib = 1 (ON is a special case of TOUCH) |
| INSIDE | Only ii = 1 |
| DISJOINT (outside) | Only ie = 1 |
| COVEREDBY | ib = ii = 1; ie = 0 |
| TOUCH | ib = 1; ii = 0, ie = * (Don't care) |
| OVERLAPBDYDISJOINT | ii = ie = 1; ib = * |
| ANYINTERACT | ib = 1 OR ii = 1 |

Test Line Geometry Optimizations

Figure 6:
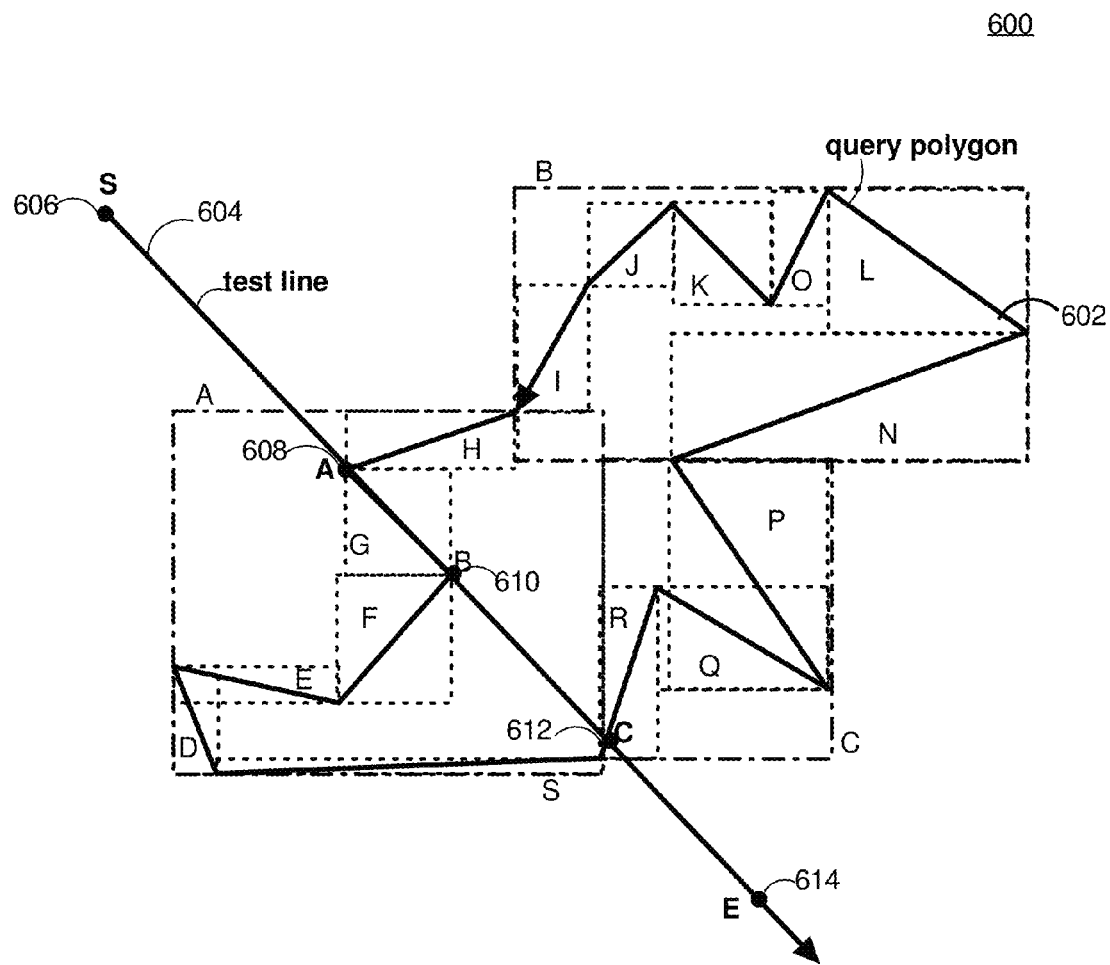
FIG. 6 depicts an example relationship between a test line and a query polygon.

FIG. 6 depicts an example relationship between a test line 604 and a query polygon 602. When the test geometry is a line or multi-line (which is 1-dimensional and has an interior), all topological relationships in FIG. 1 are possible except CONTAIN, COVERS, and EQUAL, because a 1-dimensional spatial object cannot contain, cover, or equal a two-dimensional spatial object.

To arrive at the values in the matrix, the endpoints and the manner in which the test line 604 intersects the query polygon 602 are considered.

The Endpoints

Referring to FIG. 6, consideration of the line's endpoints involves determining which endpoints are in the boundary according to the definition of "in the boundary" of the test line 604, given above. For any end points in the boundary, the system determines if they are inside, on, or outside the query polygon, which corresponds to setting values bb, bi, and be, respectively. In FIG. 6, endpoint S is "in the line boundary" and outside the query polygon 602. In addition, if bb is set, eb can also be set; if bi is set then ii can also be set; and if be is set then ie can also be set.

For any endpoints not in the line boundary, the system checks to determine if those endpoints are inside, on, or outside the query polygon, which corresponds to setting values ib, ii, and ie, respectively. This is accomplished in a manner similar to the way in which points are processed.

After the endpoints are considered, the 9-intersection matrix for the line SE and the depicted query polygon has the values, $$\begin{bmatrix} bb & ib & eb \\ bi & ii & ei \\ be & ie & ee \end{bmatrix} = \begin{bmatrix} 0 & 0 & * \\ 0 & 0 & * \\ 1 & 1 & * \end{bmatrix},$$

because the endpoints of the line are outside the query polygon.

The Manner of Intersection

For the other portion of the line or multi-line (i.e., the portion without endpoints), the system determines the manner in which that portion intersects the query polygon, which determines the settings of values ib, ii, and ie. The line or multi-line is broken down into segments and values in the 9-intersection matrix for each segment are determined in a two-step process. In FIG. 6, the segments of the test line 604 are SA, AB, BC, and CE, based on points S 606, A 608, B, 610, C 612, and E 614.

Intersection or Collinearity

In the first step of the process, a selected line segment is used to search the IMR-tree of the query polygon 602 to determine whether there is any intersection or collinearity between the selected segment and any boundary line segments of the query polygon 602. Bit ib is set if there is any intersection or collinearity. In FIG. 6, line segment AB is collinear with a boundary line segment of the query polygon 602. So, at this point, the 9-intersection matrix becomes $$\begin{bmatrix} bb & ib & eb \\ bi & ii & ei \\ be & ie & ee \end{bmatrix} = \begin{bmatrix} 0 & 1 & * \\ 0 & 0 & * \\ 1 & 1 & * \end{bmatrix}.$$

Non-Collinearity

The second step of the process considers each newly generated line segment, SA, AB, BC, and CE in turn. The system uses the intersection point or points of test line SE to search the IMR-tree to determine whether any of the newly generated segments SA, AB, BC, CE, is inside or outside of the query polygon 602. If one of the newly generated segments is inside the query polygon, then the ii bit is set and if the segment is outside the query polygon, then the ie bit is set.

In the example, segments SA, BC, and CE are not collinear. Segments SA and CE are outside and segment BC is inside the query polygon. The 9-intersection matrix now becomes $$\begin{bmatrix} bb & ib & eb \\ bi & ii & ei \\ be & ie & ee \end{bmatrix} = \begin{bmatrix} 0 & 1 & * \\ 0 & 1 & * \\ 1 & 1 & * \end{bmatrix}.$$

Thus, bb, bi, be, ib, ii, and ie are sufficient to determine the topological relationship between a line or multi-line and a query polygon or multi-polygon. Values eb, ei, and ee can be set because SE does not fully contain the boundary of the query polygon. The final 9-intersection matrix is $$\begin{bmatrix} bb & ib & eb \\ bi & ii & ei \\ be & ie & ee \end{bmatrix} = \begin{bmatrix} 0 & 1 & * \\ 0 & 1 & * \\ 1 & 1 & * \end{bmatrix}.$$

The relationship between line segment SE, according to the 9-intersection matrix, can be described as OVERLAPBDY-DISJOINT and the relationship ANYINTERACT is certainly true as well.

Test Polygon Geometry Optimizations

When the test geometry is a polygon or a multi-polygon and the query object is a polygon, then all topological relationships are possible except ON. The procedure for determining the relationship assumes that the test geometry is a test polygon, for purposes of discussion, even though it is applicable to multi-polygons.

First Point of Test Polygon

Figure 7:
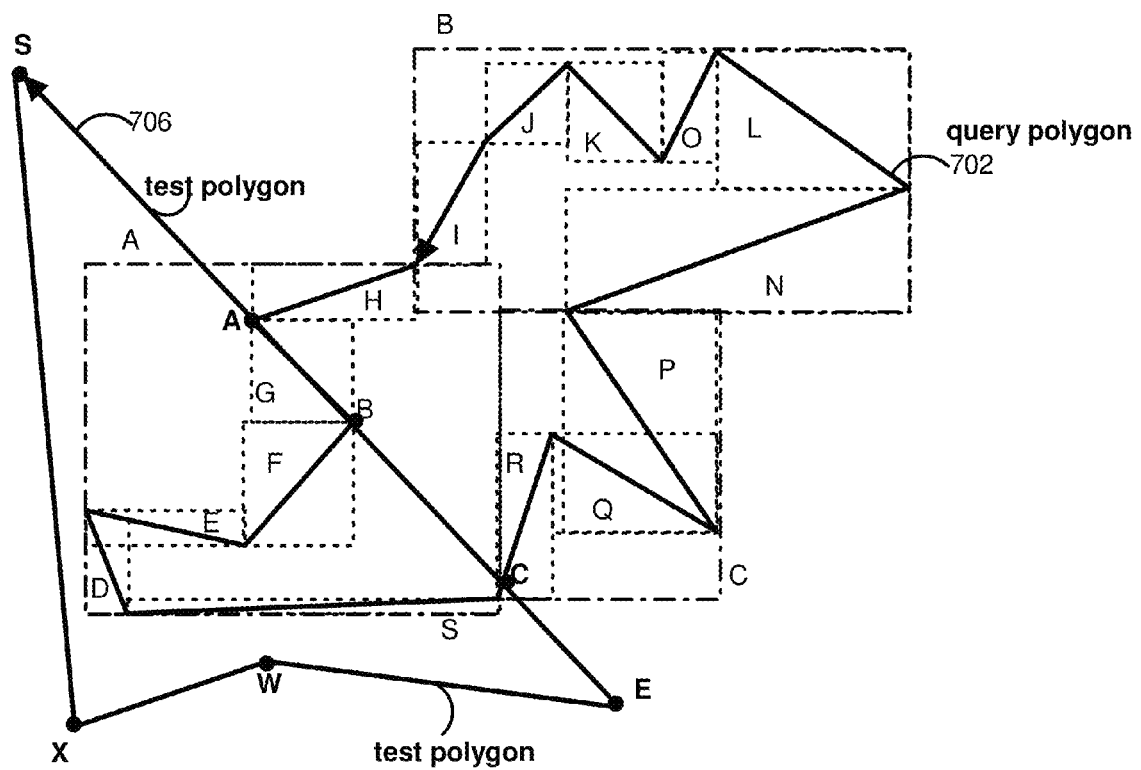
FIG. 7 depicts an example relationship between a test polygon and a query polygon.

FIG. 7 depicts an example relationship between a test polygon 706 and a query polygon 702. Referring to FIG. 7, first the system takes the first point S in FIG. 7 of the test polygon and determines if this point is inside, on, or outside the query polygon, which corresponds to setting bi, bb, or be, respectively, which are the values in the first column in the 9-intersection matrix.

Thus, if the boundary point of the test polygon is inside the query polygon then (bi=1) and an exterior and interior point of the test polygon are inside the query polygon. In this case, the values of ii and ei can also be set, because if a boundary point of a test polygon is inside the query polygon, then an exterior point and interior point of the test polygon are inside the query polygon. Therefore, the matrix would be:

$$\begin{bmatrix} bb & ib & eb \\ bi & ii & ei \\ be & ie & ee \end{bmatrix} = \begin{bmatrix} 0 & 0 & 0 \\ 1 & 1 & 1 \\ 0 & 0 & 0 \end{bmatrix}.$$

If a boundary point of the test polygon is outside of the query polygon, such as point S in FIG. 7, then (be=1) and an interior point of the test polygon is outside of the query polygon. In this case, the value ie can also be set, because if a boundary point of a test polygon is outside a query polygon, then an interior point of the test polygon is outside the query polygon. Therefore, the matrix is:

$$\begin{bmatrix} bb & ib & eb \\ bi & ii & ei \\ be & ie & ee \end{bmatrix} = \begin{bmatrix} 0 & 0 & 0 \\ 0 & 0 & 0 \\ 1 & 1 & 0 \end{bmatrix}.$$

Rest of Test Polygon

Next, the system considers the rest of test polygon (i.e., except the first point of test polygon). The values in the 9-intersection matrix are determined by the following two steps.

Step 1

The test polygon is broken down into its constituent line segments. In the FIG. 7, these are segments SX, XW, WE, and ES, in counter-clockwise order.

For each constituent line segment (SX, XW, WE, and ES), the IMR-tree of the query polygon 702 is searched to determine if there is any intersection or collinearity between any constituent line segment and the line segments of the query polygon 702. In the example, segment SE intersects the query polygon at points A, B, and C.

If there is an intersection or collinearity, the value of bb bit is set, and newly generated line segments are formed from the intersecting constituent segment according to the intersection points, A, B, and C, with the query polygon 702. In the example, newly generated segments SA, AB, BC, and CE are formed according to the intersections of line SE with the query polygon 702.

Then, the system determines whether each newly generated line segment, SA, AB, BC, or CE, is collinear with a line segment of the query polygon. If a segment is collinear and both segments have the same direction, then values bb and bi are set. If they have different directions, then values bb, ie, and ei can be set. In FIG. 7, segment AB is collinear with a line segment of the query polygon and the lines have opposite directions.

Step 2

Next, for each newly generated line segment that is not collinear, the system uses the intersection point to determine if the newly generated line segment is inside or outside the query polygon. If the newly generated line segment is outside the query polygon, then values be and ie can be set. In the example, segments SA and CE are outside the query polygon, so the 9-intersection matrix becomes:

$$\begin{bmatrix} bb & ib & eb \\ bi & ii & ei \\ be & ie & ee \end{bmatrix} = \begin{bmatrix} 1 & 0 & 0 \\ 0 & 0 & 1 \\ 1 & 1 & 0 \end{bmatrix}$$

When the newly generated line segment is inside the query polygon, then values bi, ii, and ei can be set. In the example, segment BC is inside the query polygon, so the matrix now becomes:

$$\begin{bmatrix} bb & ib & eb \\ bi & ii & ei \\ be & ie & ee \end{bmatrix} = \begin{bmatrix} 1 & 0 & 0 \\ 1 & 1 & 1 \\ 1 & 1 & 0 \end{bmatrix}$$

In some cases, the values ib, ii, and ie can be set based on a theory regarding two intersecting polygons. The theorem states that for two valid polygons $P_1$ and $P_2$, if $P_1$'s polygon ring ($PR_1$) intersects $P_2$'s polygon ring ($PR_2$) at point I, consider two line segments HI and IJ on $PR_1$, where one of HI and IJ is completely inside $PR_2$ while the other is not completely inside $PR_2$ (i.e., it is either completely outside $PR_2$ or on $PR_2$), then one boundary line segment of $P_1$ must be inside $P_2$. In the example in FIG. 7, the test polygon 706 intersects the query polygon at point B with boundary line segment F of the query polygon 702 inside test polygon 706 ring and boundary line segment G of the query polygon 702 on test polygon 706 ring, so one of boundary line segments in query polygon must be inside test polygon. In the case, boundary line segment F is inside the test polygon. (Importantly, there is a difference between a test polygon ring and a test polygon: if an object is inside a polygon ring, that object is not necessarily in inside the polygon.) Thus values ib, ii, and ie can be set in a manner similar to the steps for handling a line and a query polygon, as described above.

In some cases, such as polygons with interior rings, setting values ib, ii, and ie, or eb and ei is more complex. Performing the following procedure, after the two steps above, handles these cases.

The system finds the first line segment from each ring of the query polygon and inserts this line segment and its associated data structure into an array. Then the system scans each line of the test polygon to determine the relationship between each line of the test polygon and the query polygon lines in the array. Three outcomes are possible. (1) The line segment in the array is collinear with a line segment of the test polygon. (2) The first point of the line segment in the array is intersected by one or more line segments in the test polygon. (3) The first point of the line segment is either completely outside or completely inside the test polygon.

The first outcome is handled by collinearity step above.

The second and third outcomes permit the setting of the ib, ii, ie, eb, or ei values.

In the second outcome, the system finds the line segment of the test polygon that is closest to the line segment of the query polygon. Next, the system removes the intersection point from the query polygon to convert the line segment of the query polygon to an open line segment. Then, the system determines whether the open line segment of the query polygon is inside or outside the test polygon. If the open line segment is inside the test polygon, then values ib, ii and ie can be set. If it is outside the test polygon, then values eb and ei can be set. Both the proximity test and the open line segment are needed to make the determination.

One way to perform the proximity test is by comparing the angles of the test polygon line segments with the first line segment of the query polygon, with lines having the smaller angle being closer.

In the third outcome, if the first point of the line segment of the query polygon is outside of the test polygon, then values eb and ei can be set. If the first point of the line segment of the query polygon is inside the test polygon, then values ib, ii, and ie can be set.

In the example of FIG. 7, the matrix becomes $$\begin{bmatrix} bb & ib & eb \\ bi & ii & ei \\ be & ie & ee \end{bmatrix} = \begin{bmatrix} 1 & 1 & 1 \\ 1 & 1 & 1 \\ 1 & 1 & 1 \end{bmatrix}$$

and the relationship is OVERLAPBDYINTERSECT.

Thus, for a test polygon, the 9-intersection values can also be set sequentially, locally, and independently.

If any trigger bit for a certain topological relationship is set, the test polygon can be discarded or returned. For example, if bit ii for TOUCH or bit bb, bi, ib, or ii for ANYINTERACT is set, then the test polygon can be discarded or returned.

Geodetic Geometries

The IMR-tree described above is applicable not only to 2D non-geodetic geometries, but also to 2D geodetic geometries.

2D Geodetic coordinates are coordinates for the surface of the earth considered as an oblate ellipsoid of revolution having two coordinates, latitude, and longitude. These coordinates can be converted to 3D Earth centered coordinates and 3D minimal bounding boxes (MBB) can be built on those coordinates and used in an IMR-tree for the query geometry. An MBR in the test geometry now becomes a 3D MBB and the optimizations described above in regard to MBRs apply. For example, the system determines whether each of the six boundary faces in a leaf MBB is inside, intersects, or is outside of the query polygon. If any boundary face is outside the query polygon, its test geometry can be discarded in the cases of COVEREDBY, INSIDE, and ON.

Arc Geometries

Both test geometries and query geometries can contain arcs as a component of a line or a polygon. In the case of the query geometry, the IMR-tree is built with any arcs that are present. However, arc-arc and arc line intersections need adjustments, as there can be two possible intersection points for arc-arc and arc-line intersections. To handle this, in one embodiment, the arc is split into several arcs at the intersection points. For each newly generated arc, the system obtains the tangent line from the intersection point and determines which pair of tangent lines is the closest. In one technique, angles between the lines can determine which pair is closest. In another technique, values of an alpha function can be compared, where $$\text{alpha} = \begin{cases} 1/\text{radius} & \text{if arc center to left} \\ 0 & \text{if line} \\ -1/\text{radius} & \text{if arc center to right} \end{cases}$$

By considering the difference between alpha values, the system can decide which pair in a set of tangent lines is the closest, even if one of the tangent lines is collinear with another tangent line or line.

Composite Topological Relationships

Composite topological relationships are those formed by the logical 'OR' of the primary relationships. To include such relationships, some adjustments are needed. For example, for the COVEREDBY relationship, if a non-leaf MBR does not intersect the query polygon, its descendent test geometries can be discarded. However, if the composite relationship INSIDE+COVEREDBY is considered, then the descendant geometries cannot be discarded. Additionally, if bit be or bit ie are set for a test geometry, then INSIDE+COVEREDBY can be ruled out. The same test holds true for INSIDE+COVEREDBY+EQUAL.

The composite relationship OVERLAPPBDYDISJOINT+OVERLAPBDYINTERSECT can be verified by testing that values ii, ie, and ei are all set.

Some relationships between spatial objects are useful even though they are not topological relationships. Such relationships include WITHIN_DISTANCE and nearest neighbor (NN). An embodiment can handle the WITHIN_DISTANCE relationship by building the IMR-tree on the boundary line segments of the original query polygon and performing the above-described MBR optimizations. During those optimizations, the system enlarges the MBR by the distance and uses the new MBR to search the in-memory tree of the query polygon. The system then splits a complex test geometry into simple primitives, point, line, and arc, and searches the IMR-tree with these primitives. If any primitive (point, line, or arc) of the test geometry is already within the distance of a query polygon, the rest of the test geometry need not be considered.

Query Lines

Figure 8A:
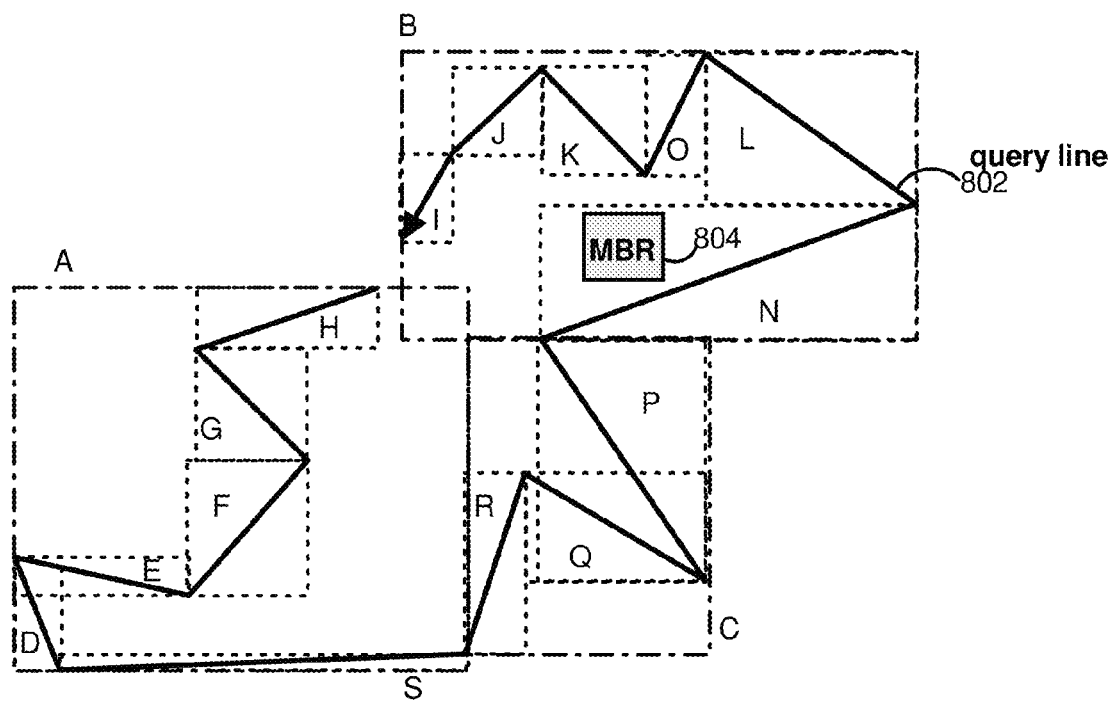
FIG. 8A depicts an example relationship between an MBR for a test object and a query line.

In one embodiment, query objects are query lines instead of query polygons. An IMR-tree is constructed on the query lines in a manner similar to constructing the tree for a query polygon. FIG. 8A depicts a query line 802 as the query object.

MBR Optimizations

These optimizations apply to all topological relationships except CONTAINS, COVERS, and EQUAL.

Non-Leaf Optimizations

The IMR-tree for the query line permits quick determination of whether a non-leaf MBR for the test object intersects the query line. The following optimizations are used to further determine the topological relationships.

For all topological relationships except DISJOINT, if a non-leaf MBR does not intersect the query line, as in FIG. 8A, descendent test geometries of the non-leaf MBR need no further processing.

Figure 8B:
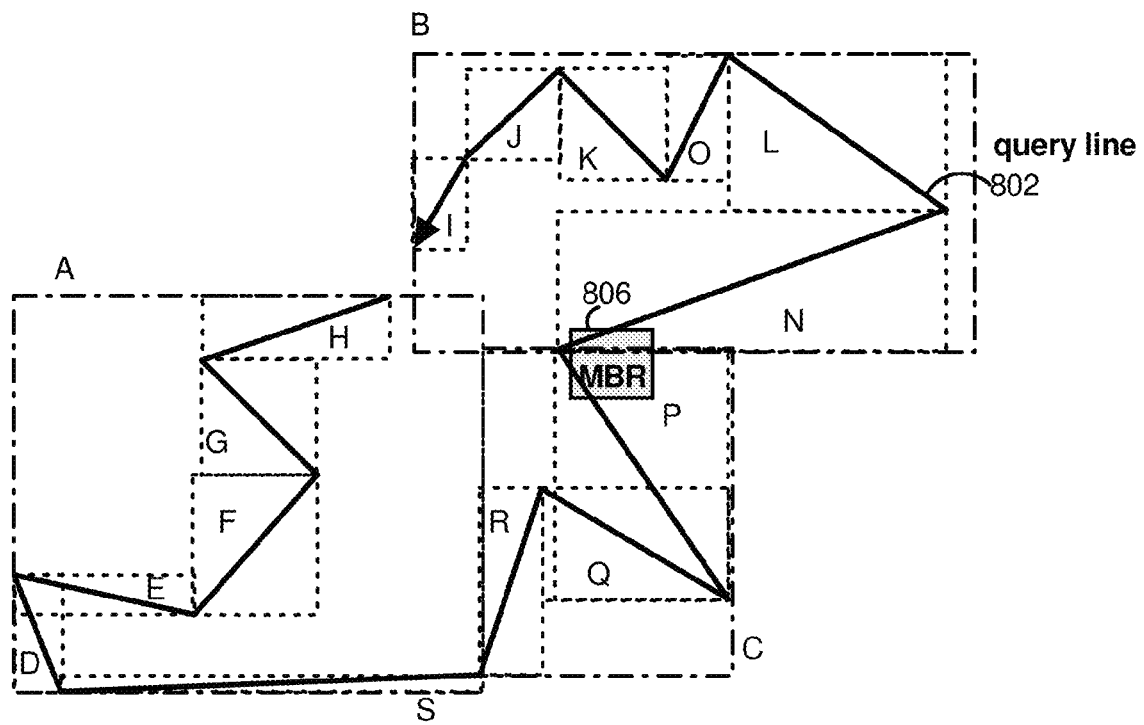
FIG. 8B depicts an example relationship between an MBR for a test object and a query line.

For COVEREDBY, ON, and OVERLAPBDYINTERSECT, if a non-leaf MBR for the test object does not contain any boundary points of the query line as in FIG. 8B, descendent test geometries of the non-leaf MBR need no further processing.

Leaf Optimizations

For a leaf MBR, the system uses the IMR-tree to determine if the MBR intersects the query line. The following optimizations are used to further determine the topological relationships.

For all topological relationships except DISJOINT, if a leaf MBR does not intersect the query line, as in FIG. 8A, then its test geometry need not be further considered.

For COVEREDBY, ON, and OVERLAPBDYINTERSECT, if a leaf MBR does not contain any boundary points of the query line, as in FIG. 8B, its test geometry need not be further considered. (Only a test point can be ON a query line, and the leaf MBR of a test point is the test point itself.)

If a leaf MBR does intersect a query line as in FIG. 8B, then the system performs additional optimizations by checking if each of the four boundary edges of the leaf MBR intersects the query line, in the case of COVERDBY, and INSIDE.

If any of the four boundary edges does not intersect the query line, its test geometry need not be further considered.

In FIG. 8B, the test geometry enclosed by a leaf MBR cannot be COVERED, or INSIDE the query line because the right boundary edge does not intersect the query line.

Test Geometry Optimizations for Query Lines

Test Point Geometry Optimizations

Figure 8C:
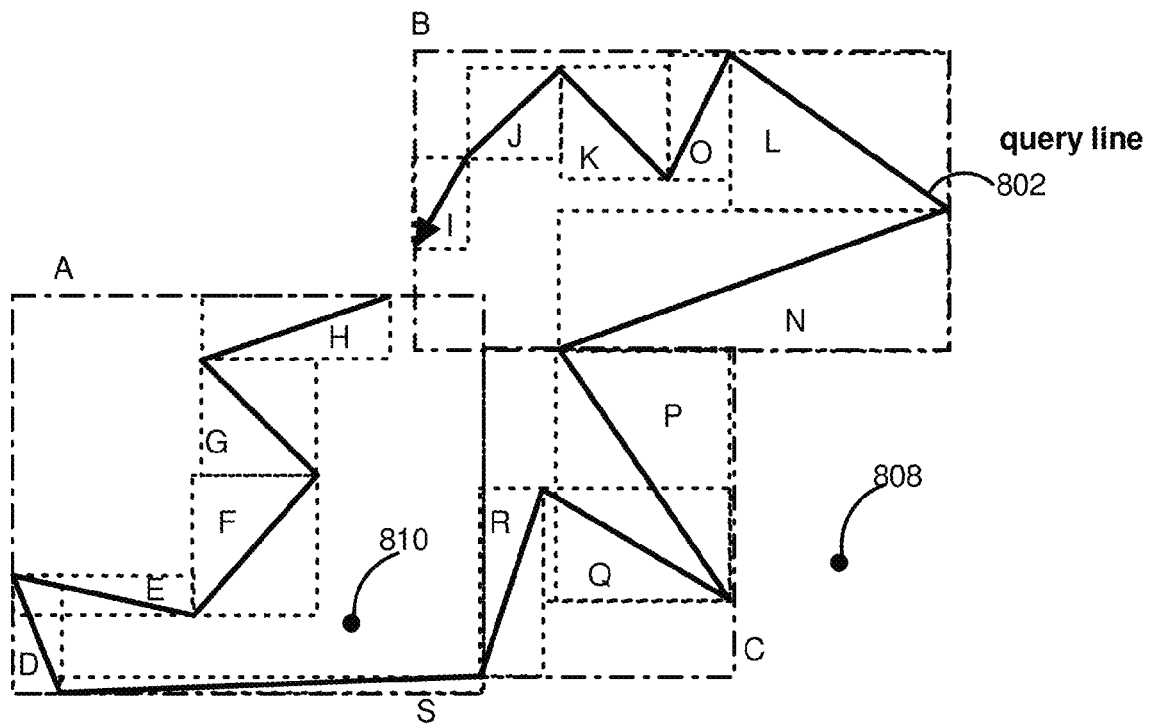
FIG. 8C depicts an example relationship between a test point and a query line.

When the test geometry is a single point such as 808 or 810 in FIG. 8C, only the relationships INSIDE, ON, and DISJOINT are possible with a query line. The system searches the IMR-tree to determine these relationships. If the search discovers that the test point intersects the interior of the query line, then value ii is set. If the search discovers that the test point intersects one of the boundary points of the query line, then value ib is set. If the search discovers that the test point does not intersect the query line, as in FIG. 8C, then the bit ie is set.

If the test geometry is a multi-point, each point in the multi-point is tested as described above.

Test Line Geometry Optimizations

Figure 8D:
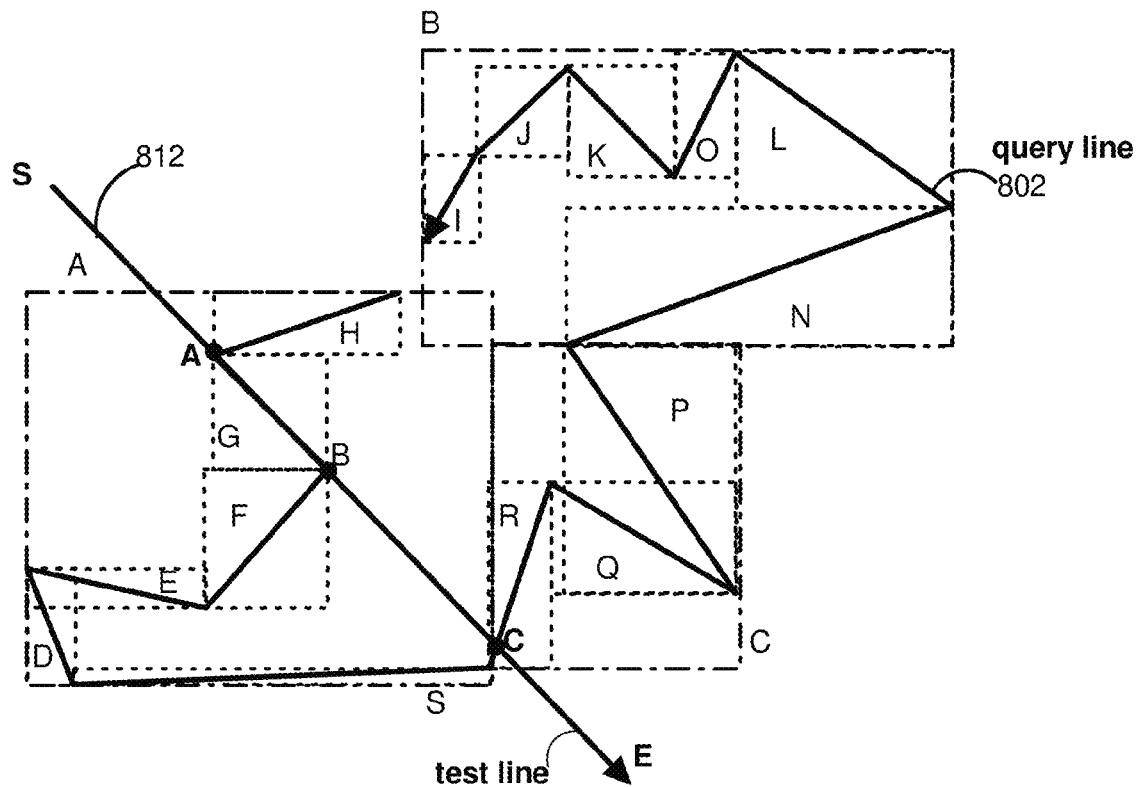
FIG. 8D depicts an example relationship between a test line and a query line.

When the test geometry is a line or multi-line and the query object is a line, all topological relationships, except ON, are possible. FIG. 8D depicts a line test object intersecting a query line.

Referring to FIG. 8D, the system first determines the ends point of the test line that are in the boundary of the test line. For the endpoints in the boundary, the system determines if they are inside, on, or outside, the query line, which corresponds to setting values bi, bb, and be, respectively. Additionally, when bit bi is set, then ei can be set, and when be is set ie can be set.

For the remaining end points that are not in the boundary of the test line, the system determines if they are inside, on, or outside the query line, which corresponds to setting values ii, ib, and ie.

The system next determines the manner in which the remaining portion of the line intersects the query line, which corresponds to the settings of values ii, ib and ie. Each segment of the line or multi-line is considered separately. When the segment intersects the query line, the system divides the segment into newly generated line segments according to the intersection points.

In FIG. 8D, the line segment SE is divided into newly generated segments SA, AB, BC, and CE. Open Line Segment BC is outside the query line. Open Line Segment CE is outside the query line, so bit ie can be set.

Collinearity

When one of the newly generated line segments is collinear with a portion of the query line, as AB is in FIG. 8D, then the system determines if value ei can be set. This requires that the system determine whether the next line segment in the query line is collinear with any segment of the test line. If there is no collinear case, then value ei can be set. Determining if a segment of the query line is collinear with any segment of the test line may require that a new IMR-tree be constructed on the test line, so that the new IMR-tree can be searched using segments of the query line.

Test Polygon Geometry Optimizations

Figure 8E:
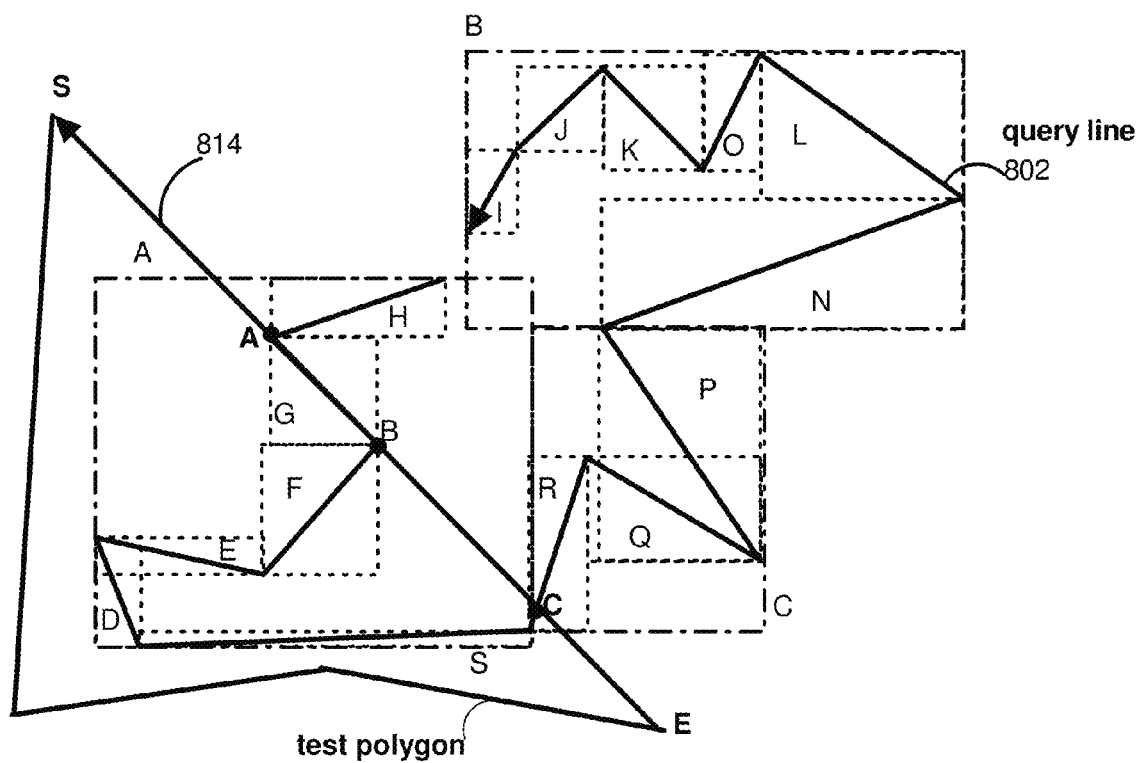
FIG. 8E depicts an example relationship between a test polygon and a query line.

When the test geometry is a polygon or a multi-polygon, as in FIG. 8E, all relationships, except ON, INSIDE, COVEREDBY, and EQUAL, are possible.

The system considers each line segment of the test polygon in turn. Each line segment is assumed to be properly oriented, as exterior ring boundaries traverse counterclockwise and interior ring boundaries traverse clockwise. Each line segment is divided into newly generated line segments according to its intersections with the query line. For example, if segment SE is considered part of a test polygon, then it is divided into four new segments, SA, AB, BC, and CE. For segment AB, the collinear line, values bi and ie can be set. For segments SA, BC, and CE, the system can set values be and ie.

Additionally, the system builds a new IMR-tree on the test geometry (polygon or multi-polygon) and uses the intersected line segment of the query line to search this new IMR-tree to determine whether the line segments of the query line are inside of or outside of the test geometry. This determines how to set values ii and ei for the particular line segment of the query line.

Query Collections

Figure 9A:
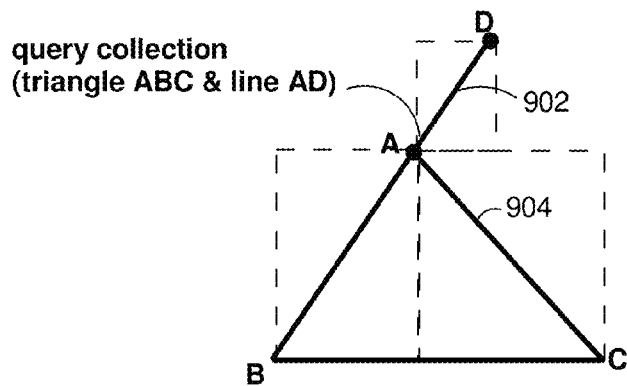
FIG. 9A depicts an example query collection with bounding boxes.

A collection geometry includes a collection of points, lines, and polygons. In a valid collection geometry, polygons are not self-crossing, and points or lines are not on or inside polygons. Also, in such collections, only interior points of a line touch a polygon. FIG. 9A depicts a query collection that includes a triangle ABC 904 and a line AD 902. Point A is an interior point of the line AD.

Figure 9B:
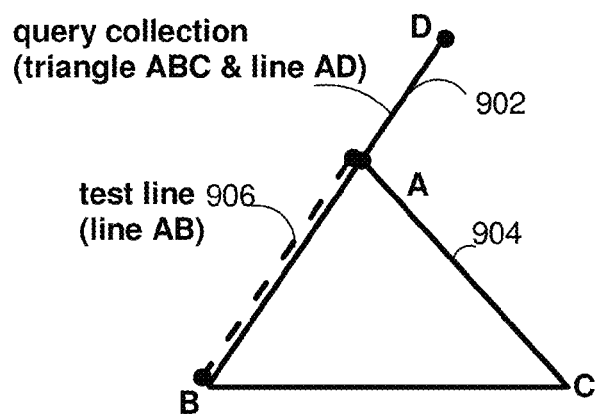
FIG. 9B depicts an example query collection and a test line.

Additionally, some 9-intersection matrices can only occur when the geometry is a collection geometry. For example, referring to FIG. 9B, the relationship TOUCH-TOUCH can occur when one spatial object is a collection geometry that includes a triangle ABC 904 and a line AD 902, and the other spatial object, the test object, is a line AB 906. The 9-intersection matrix for the relationship depicted in FIG. 9B is $$\begin{bmatrix} bb & ib & eb \\ bi & ii & ei \\ be & ie & ee \end{bmatrix} = \begin{bmatrix} 1 & 1 & 0 \\ 1 & 0 & 0 \\ 1 & 1 & 1 \end{bmatrix}.$$

Figure 9C:
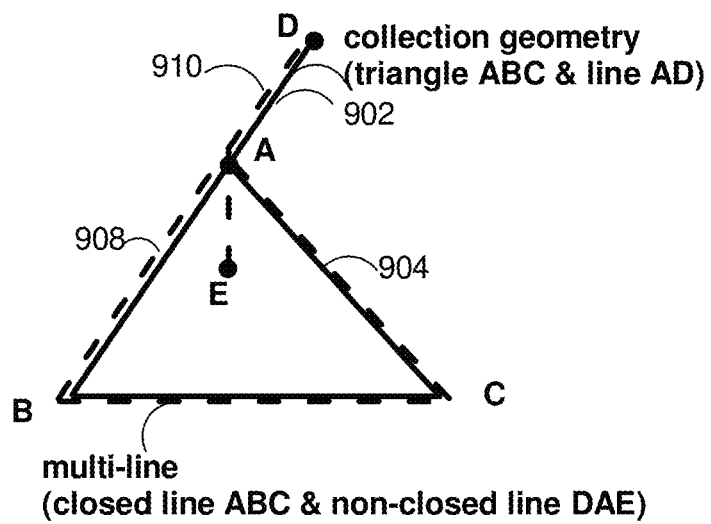
FIG. 9C depicts an example query collection and a test multi-line.

Another example is the relationship COVEREDBY-COVERS, which occurs when one object is a collection geometry that includes a triangle ABC 904 and a line AD 902 and the other object, the test object, is a multi-line that includes line ABC 908 and a non-closed line DAE 910, as depicted in FIG. 9C. The 9-intersection matrix for the relationship depicted in FIG. 9C is $$\begin{bmatrix} bb & ib & eb \\ bi & ii & ei \\ be & ie & ee \end{bmatrix} = \begin{bmatrix} 1 & 1 & 0 \\ 1 & 1 & 0 \\ 0 & 1 & 1 \end{bmatrix}.$$

The following MBR optimizations pertain to the case when the query object is a collection and an IMR-tree is built on a collection. All topological relationships except CONTAINS, COVERS, and EQUAL are possible.

MBR Optimizations
Non-Leaf MBR Optimizations

An IMR-tree built on the contents of a query collection, as depicted in FIG. 9A, 9B, or 9C, permits quick determination of whether an MBR of the test geometry intersects the query collection. The following optimizations help to further determine the topological relationships.

For ANYINTERACT and INSIDE, if a non-leaf MBR is inside a polygon of the query collection, the relationship regarding the descendent geometries of the non-leaf MBR is known and needs no further processing.

For all topological relationships except DISJOINT, if a non-leaf MBR does not intersect the query collection, the relationship of the descendent test geometries of the non-leaf MBR is known and needs no further processing.

For COVEREDBY, ON, OVERLAPBDYDISJOINT, OVERLAPBDYINTERSECT, and TOUCH, if a non-leaf MBR is inside a polygon of the query collection, the relationship of the descendant geometries of the non-leaf MBR is known and needs no further processing.

For COVEREDBY, ON, and OVERLAPBDYINTERSECT, if a non-leaf MBR does not contain any boundary points of lines in the query collection, and does not intersect any polygon rings in the query collection, descendant test geometries of the non-leaf MBR need no further processing.

Leaf MBR Optimizations

For a leaf MBR, the IMR-tree permits quick determination of whether the MBR intersects the query collection. The following optimizations help further determine the topological relationships.

For ANYINTERACT and INSIDE, if a leaf MBR is inside a polygon of the query collection, test geometries of the leaf MBR need no further processing.

For all topological relationships except DISJOINT, if a leaf MBR does not intersect the query collection, the test geometry of the leaf MBR needs no further processing.

For COVERDBY, ON, and OVERLAPBDYDISJOINT, OVERLAPBDYINTERSECT, and TOUCH, if a leaf MBR is inside a polygon of the query collection, test geometries of the leaf MBR need no further processing.

For COVEREDBY, ON, and OVERLAPBDYINTERSECT, if a leaf MBR does not contain any boundary points of lines in the query collection, and does not intersect any polygon rings in the query collection, the test geometry of the leaf MBR needs no further processing.

When a leaf MBR intersects a query collection, the following optimizations help further determine the topological relationships.

For COVEREDBY, INSIDE, and ON, if any of the four boundaries edges does not intersect the query collection, the test geometry needs no further processing.

For ON and TOUCH, if any of the four boundary edges is inside a polygon of the query collection, the test geometry needs no further processing.

For ANYINTERACT if any of the four boundary edges is inside a polygon of the query collection, the test geometry needs no further processing.

FIG. 9C shows a relationship between a collection geometry and a multi-line. The collection geometry includes triangle ABC 904 and a line segment AD 902. Multi-line geometry includes closed line ABD and non-closed line DAE.

The test geometry is a closed line DAE 908 and a non-closed line 910. The non-closed line DAE 910 is split into two segments DA and AE. Newly generated line segment DA intersects triangle ABC at point A and at all points except point A outside of triangle ABC. Newly generated line segment DA intersects line DA in the query collection. Line segment AE, except for point A, is inside triangle ABC. Point A of the test line intersects the query collection at point A, so corresponding bit ii is set.

Test Geometry Optimizations for Query Collections

In the case of query collections, optimizations to test geometries apply as well.

Figure 9D:
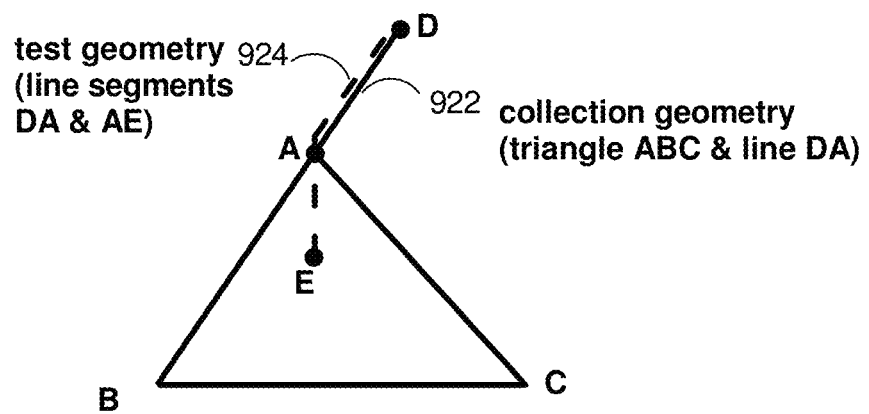
FIG. 9D depicts an example query collection and multiple line segments.

FIG. 9D depicts an example query collection 922 with triangle ABC and line AD in the collection. The test object is line DAE 924.

Processing of line DAE 924 depends on any intersections of that line with the query collection 922. In FIG. 9D, test line DAE 924 intersects the query collection 922 at point A. This requires that segment DA and segment AE be considered.

For line segment DA, the system first determines if segment DA intersects any isolated points of the query collection 922 if any such points are present. Corresponding values in the 9-intersection matrix are set.

Next, line segment DA is considered as an open line segment, i.e., as not including point A. The system determines that open line segment DA is completely outside triangle ABC of the query collection 922. Then the system determines how open line segment DA intersects line DA of the query collection 922. Additionally, open line segment AE (segment AE without point A) is completely inside triangle ABC of the query collection 922, so no further processing of open line segment AE is needed.

Finally, the system considers point A itself. Point A intersects the interior of the query collection, permitting value ii to be set in the 9-intersection matrix.

Thus, the 9-intersection matrix becomes $$\begin{bmatrix} bb & ib & eb \\ bi & ii & ei \\ be & ie & ee \end{bmatrix} = \begin{bmatrix} 1 & 0 & 1 \\ 1 & 1 & 1 \\ 0 & 0 & 1 \end{bmatrix},$$

which describes the relationship as "COVEREDBY".

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
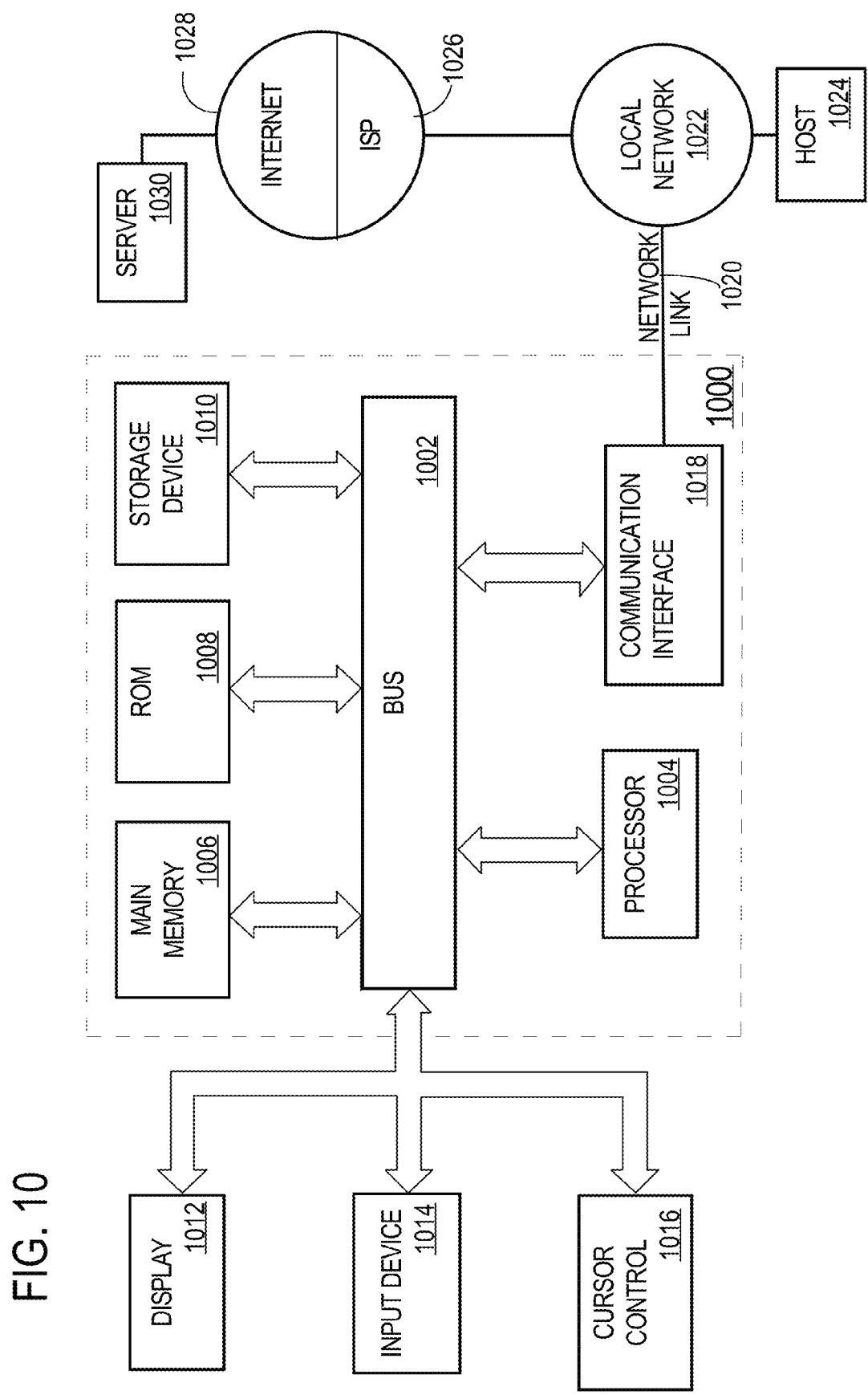
FIG. 10 depicts an example system setting suitable for embodiments.

For example, FIG. 10 is a block diagram that depicts a computer system 1000 upon which an embodiment may be implemented. Computer system 1000 includes a bus 1002 or other communication mechanism for communicating information, and a hardware processor 1004 coupled with bus 1002 for processing information. Hardware processor 1004 may be, for example, a general-purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, convert computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the embodiments, and what is intended by the applicants to be the scope of embodiments, is the literal and equivalent scope of the set of claims that issue from this application, in the specific form in which such claims issue, including any subsequent correction.

What is claimed is:

1. A method for processing queries of spatial objects, the method comprising:
   receiving a query requesting a description of a spatial relationship between a query polygon and a test object;
   obtaining the query polygon formed from a plurality of line segments, wherein the query polygon has a boundary, an interior, and an exterior;
   obtaining a minimum bounding box (MBR) containing the test object, the test object having one or more features including one or more of a boundary, an exterior, or an interior;
   obtaining an In-Memory R-tree (IMR-tree) for accessing one or more bounding boxes of the query polygon, wherein each bounding box contains a particular group of the line segments of the query polygon;
   determining a first spatial relationship between the MBR of the test object and the query polygon by searching the IMR-tree with the MBR of the test object;
   adjusting values in a 9-intersection matrix to describe the first spatial relationship, wherein the values of the matrix describe intersections of any features of the test object with the boundary, the interior, or the exterior of the query polygon;
   if the first spatial relationship does not specify the requested description:
      determining a second spatial relationship between the test object and the query polygon by searching the IMR-tree using the one or more features of the test object; and
      adjusting the values in the 9-intersection matrix to describe the second spatial relationship; and
   returning the adjusted 9-intersection matrix as an answer to the query;
   wherein the method is performed by one or more computing devices.

2. The method of claim 1,
   wherein the MBR of the test object is a non-leaf MBR, which has one or more descendent MBRs; and
   wherein determining a first spatial relationship includes
      determining whether any features of the one or more descendant MBRs of the non-leaf MBR intersect the query polygon.

3. The method of claim 1,
   wherein the MBR of the test object is a leaf MBR; and
   wherein determining a first spatial relationship includes
      determining whether any features of the leaf MBR intersect the query polygon.

4. The method of claim 1,
   wherein the MBR of the test object is a leaf MBR having four boundary edges or six boundary faces; and
   wherein determining a first spatial relationship further includes
      determining whether any of the four boundary edges or the six boundary faces of the leaf MBR intersects the query polygon.

5. The method of claim 1,
   wherein the test object is a single point, the one or more features of the test object comprising an interior; and
   wherein determining a second spatial relationship includes
      determining whether the second spatial relationship is INSIDE, ON, or DISJOINT.

6. The method of claim 1,
   wherein the test object is a line segment having endpoints, the one or more features of the test object comprising an interior, a boundary, and an exterior; and
   wherein determining a second spatial relationship includes:
      determining whether the endpoints of the line segment are inside, on, or outside the query polygon; and
      determining whether the interior of the line segment intersects the query polygon.

7. The method of claim 6, wherein determining whether the interior of the line segment intersects the query polygon includes searching the IMR-tree to determine whether the line segment intersects or is collinear with any line segments of the query polygon.

8. The method of claim 7,
   wherein the test object line segment intersects at least one line segment of the query polygon; and
   wherein determining whether the interior of the line segment intersects the query polygon further includes:
      generating new line segments based on an intersection point; and
      searching the IMR-tree to determine whether the new line segments are inside or outside the query polygon.

9. The method of claim 1,
   wherein the test object is a polygon defined by line segments and having a first point,
      the one or more features of the test object comprising an interior, a boundary, and an exterior; and
   wherein determining a second spatial relationship includes:
      obtaining the first point in the test object polygon; and
      determining whether the first point intersects the interior, boundary, or exterior of the query polygon.

10. The method of claim 9,
    wherein the test object polygon and the query polygon intersect each other; and
    wherein determining a second spatial relationship further includes for each line segment of the test object polygon, searching the IMR-tree to determine whether the line segment of the test object polygon intersects or is collinear with any line segments of the query polygon.

11. The method of claim 10,
    wherein the line segment of the test object polygon intersects at least one line segments of the query polygon; and
    wherein determining whether the line segment of the test object polygon intersects the query polygon further includes:

for each line segment of the test object polygon:
  generating new line segments based on an intersection point; and
  searching the IMR-tree to determine whether any new line segment is inside or outside the query polygon.

12. A non-transitory computer readable medium carrying one or more sequences of instructions for processing queries of spatial objects, wherein execution of the one or more sequences of instructions by one or more processors causes the one or more processors to perform:
  receiving a query requesting a description of a spatial relationship between a query polygon and a test object;
  obtaining the query polygon formed from a plurality of line segments, wherein the query polygon has a boundary, an interior, and an exterior;
  obtaining a minimum bounding box (MBR) containing the test object, the test object having one or more features including one or more of a boundary, an exterior, or an interior;
  obtaining an In-Memory R-tree (IMR-tree) for accessing one or more bounding boxes of the query polygon, wherein each bounding box contains a particular group of the line segments of the query polygon;
  determining a first spatial relationship between the MBR of the test object and the query polygon by searching the IMR-tree with the MBR of the test object;
  adjusting values in a 9-intersection matrix to describe the first spatial relationship, wherein the values of the matrix describe intersections of any features of the test object with the boundary, the interior, or the exterior of the query polygon;
  if the first spatial relationship does not specify the requested description:
    determining a second spatial relationship between the test object and the query polygon by searching the IMR-tree using the one or more features of the test object; and
    adjusting the values in the 9-intersection matrix to describe the second spatial relationship; and
  returning the adjusted 9-intersection matrix as an answer to the query.

13. The non-transitory computer readable medium of claim 12,
  wherein the MBR of the test object is a non-leaf MBR, which has one or more descendent MBRs; and
  wherein determining a first spatial relationship includes
    determining whether any features of one or more descendant MBRs of the non-leaf MBR intersect the query polygon.

14. The non-transitory computer readable medium of claim 12,
  wherein the MBR of the test object is a leaf MBR; and
  wherein determining a first spatial relationship includes determining whether any features of the leaf MBR intersect the query polygon.

15. The non-transitory computer readable medium of claim 12,
  wherein the MBR of the test object is a leaf MBR having four boundary edges or six boundary faces; and
  wherein determining a first spatial relationship further includes
    determining whether any of the four boundary edges or the six boundary faces of the leaf MBR intersects the query polygon.

16. The non-transitory computer readable medium of claim 12,
  wherein the test object is a single point, the one or more features of the test object comprising an interior; and
  wherein determining a second spatial relationship includes
    determining whether the second spatial relationship is INSIDE, ON, or DISJOINT.

17. The non-transitory computer readable medium of claim 12,
  wherein the test object is a line segment having endpoints, the one or more features of the test object comprising an interior, a boundary, and an exterior; and
  wherein determining a second spatial relationship includes:
    determining whether the endpoints of the line segment are inside, on, or outside the query polygon; and
    determining whether the interior of the line segment intersects the query polygon.

18. The non-transitory computer readable medium of claim 13, wherein determining whether the interior of the line segment intersects the query polygon includes searching the IMR-tree to determine whether the line segment intersects or is collinear with any line segments of the query polygon.

19. The non-transitory computer readable medium of claim 18,
  wherein the test object line segment intersects at least one line segment of the query polygon; and
  wherein determining whether the interior of the line segment intersects the query polygon further includes:
    generating new line segments based on an intersection point; and
    searching the IMR-tree to determine whether the new line segments are inside or outside the query polygon.

20. The non-transitory computer readable medium of claim 12,
  wherein the test object is a polygon defined by line segments and having a first point,
    the one or more features of the test object comprising an interior, a boundary, and an exterior; and
  wherein determining a second spatial relationship includes:
    obtaining the first point in the test object polygon; and
    determining whether the first point intersects the interior, boundary, or exterior of the query polygon.

21. The non-transitory computer readable medium of claim 20,
  wherein the test object polygon and the query polygon intersect each other; and
  wherein determining a second spatial relationship further includes
    for each line segment of the test object polygon,
      searching the IMR-tree to determine whether the line segment of the test object polygon intersects or is collinear with any line segments of the query polygon.

22. The non-transitory computer readable medium of claim 21,
  wherein the line segment of the test object polygon intersects at least one line segments of the query polygon; and
  wherein determining whether the line segment of the test object polygon intersects the query polygon further includes:
    for each line segment of the test object polygon:
      generating new line segments based on an intersection point; and
      searching the IMR-tree to determine whether any new line segment is inside or outside the query polygon.

23. A method for processing queries of spatial objects, the method comprising:
   receiving a query requesting a description of a spatial relationship between a query line and a test object;
   obtaining the query line formed from a plurality of line segments, wherein the query line has a boundary, an interior, and an exterior;
   obtaining a minimum bounding box (MBR) containing the test object, the test object having one or more features including one or more of a boundary, exterior, or interior;
   obtaining an In-Memory R-tree (IMR-tree) for accessing one or more bounding boxes of the query line, wherein each bounding box contains a particular group of the line segments of the query line;
   determining a first spatial relationship between the MBR of the test object and the query line by searching the IMR-tree with the MBR of the test object;
   adjusting values in a 9-intersection matrix to capture the first spatial relationship, wherein the values of the matrix describe intersections of any features of the test object with the boundary, the interior, or the exterior of the query line;
   if the first spatial relationship does not specify the requested description:
      determining a second spatial relationship between the test object and the query line by searching the IMR-tree using the test object; and
      adjusting values in the 9-intersection matrix to capture the second spatial relationship; and
   returning the adjusted 9-intersection matrix as an answer to the query;
   wherein the method is performed by one or more computing devices.

24. The method of claim 23,
   wherein the MBR of the test object is a non-leaf MBR, which has one or more descendent MBRs; and
   wherein determining a first spatial relationship includes determining whether any features of the one or more descendant MBRs of the non-leaf MBR intersect the query line.

25. The method of claim 23,
   wherein the MBR of the test object is a leaf MBR; and
   wherein determining a first spatial relationship includes determining whether any features of the leaf MBR intersect the query line.

26. The method of claim 25,
   wherein the MBR of the test object is a leaf MBR having four boundary edges or six boundary faces; and
   wherein determining a first spatial relationship further includes determining whether any of the four boundary edges or the six boundary faces of the leaf MBR intersects the query line, if the leaf MBR intersects the query line.

27. The method of claim 23,
   wherein the test object is a single point; and
   wherein determining a second spatial relationship includes determining whether the second spatial relationship is INSIDE, ON, or DISJOINT.

28. The method of claim 23,
   wherein the test object is a line segment having endpoints, the one or more features of the test object comprising an interior, boundary, and exterior; and
   wherein determining a second spatial relationship includes:
      determining whether the endpoints of the line segment are inside, on, or outside the query line; and
      determining whether the interior of the line segment intersects the query line.

29. The method of claim 28,
   wherein determining whether the interior of the line segment intersects the query line includes:
      determining any intersection points between the test object line segment and the query line;
      splitting the test object line segment into newly generated line segments based on the intersection points; and
      determining if any of the newly generated line segments is collinear with a portion of the query line.

30. The method of claim 29,
   wherein determining whether the interior of the line segment intersects the query line further includes:
      building an IMR-tree on the test object line segment; and
      searching the IMR-tree built on the test object line segment with segments of the query line to find any segments of the query line that are not collinear with the newly generated line segments of the test object line segment.

31. The method of claim 23,
   wherein the test object is a polygon and the one or more features of the test object comprise an interior, boundary, and exterior; and
   wherein determining a second spatial relationship includes:
      for each line segment of the test object polygon:
         determining any intersection points between the line segment of the test object polygon and the query line;
         splitting the line segment into newly generated line segments based on the intersection points;
         determining if any newly generated line segments is collinear with the query line; and
         determining if any of the newly generated line segments intersects a boundary point of the query line.

32. The method of claim 31, wherein determining a second spatial relationship further includes:
   building an IMR-tree on the test object polygon; and
   searching the test object IMR-tree built on the test object polygon with the intersected line segment of the query line to determine if the intersected line segment is inside or outside the test object polygon.

33. A non-transitory computer readable medium carrying one or more sequences of instructions for processing queries of spatial objects, wherein execution of the one or more sequences of instructions by one or more processors causes the one or more processors to perform:
   receiving a query requesting a description of a spatial relationship between a query line and a test object;
   obtaining the query line formed from a plurality of line segments, wherein the query line has a boundary, an interior, and an exterior;
   obtaining a minimum bounding box (MBR) containing the test object, the test object having one or more features including one or more of a boundary, exterior, or interior;
   obtaining an In-Memory R-tree (IMR-tree) for accessing one or more bounding boxes of the query line, wherein each bounding box contains a particular group of the line segments of the query line;
   determining a first spatial relationship between the MBR of the test object and the query line by searching the IMR-tree with the MBR of the test object;
   adjusting values in a 9-intersection matrix to capture the first spatial relationship, wherein the values of the matrix describe intersections of any features of the test object with the boundary, the interior, or the exterior of the query line;
if the first spatial relationship does not specify the requested description:
    determining a second spatial relationship between the test object and the query line by searching the IMR-tree using the test object; and
    adjusting values in the 9-intersection matrix to capture the second spatial relationship; and
returning the adjusted 9-intersection matrix as an answer to the query.

34. The non-transitory computer readable medium of claim 33,
wherein the MBR of the test object is a non-leaf MBR, which has one or more descendent MBRs; and
wherein determining a first spatial relationship includes determining whether any features of the one or more descendant MBRs of the non-leaf MBR intersect the query line.

35. The non-transitory computer readable medium of claim 33,
wherein the MBR of the test object is a leaf MBR; and
wherein determining a first spatial relationship includes determining whether any features of the leaf MBR intersect the query line.

36. The non-transitory computer readable medium of claim 35,
wherein the MBR of the test object is a leaf MBR having four boundary edges or six boundary faces; and
wherein determining a first spatial relationship further includes determining whether any of the four boundary edges or the six boundary faces of the leaf MBR intersects the query line, if the leaf MBR intersects the query line.

37. The non-transitory computer readable medium of claim 33,
wherein the test object is a single point; and
wherein determining a second spatial relationship includes determining whether the second spatial relationship is INSIDE, ON, or DISJOINT.

38. The non-transitory computer readable medium of claim 33,
wherein the test object is a line segment having endpoints, the one or more features of the test object comprising an interior, boundary, and exterior; and
wherein determining a second spatial relationship includes:
    determining whether the endpoints of the line segment are inside, on, or outside the query line; and
    determining whether the interior of the line segment intersects the query line.

39. The non-transitory computer readable medium of claim 38,
wherein determining whether the interior of the line segment intersects the query line includes:
    determining any intersection points between the test object line segment and the query line;
    splitting the test object line segment into newly generated line segments based on the intersection points; and
    determining if any of the newly generated line segments is collinear with a portion of the query line.

40. The non-transitory computer readable medium of claim 39,
wherein determining whether the interior of the line segment intersects the query line further includes:
    building an IMR-tree on the test object line segment; and
    searching the IMR-tree built on the test object line segment with segments of the query line to find any segments of the query line that are not collinear with the newly generated line segments of the test object line segment.

41. The non-transitory computer readable medium of claim 33,
wherein the test object is a polygon and the one or more features of the test object comprise an interior, boundary, and exterior; and
wherein determining a second spatial relationship includes: for each line segment of the test object polygon:
    determining any intersection points between the line segment of the test object polygon and the query line;
    splitting the line segment into newly generated line segments based on the intersection points;
    determining if any newly generated line segments is collinear with the query line; and
    determining if any of the newly generated line segments intersects a boundary point of the query line.

42. The non-transitory computer readable medium of claim 41, wherein determining a second spatial relationship further includes:
    building an IMR-tree on the test object polygon; and
    searching the test object IMR-tree built on the test object polygon with the intersected line segment of the query line to determine if the intersected line segment is inside or outside the test object polygon.

43. A method for processing queries of spatial objects, the method comprising:
    receiving a query requesting a description of a spatial relationship between a query collection of spatial objects and a test object;
    obtaining the query collection of spatial objects, wherein the spatial objects include points, lines, and polygons, wherein the lines and polygons are defined by one or more line segments, and wherein the query collection has a boundary, an interior, and an exterior; and
    obtaining a minimum bounding box MBR containing the test object, the test object having one or more features including one or more of a boundary, exterior, or interior;
    obtaining an IMR-tree for accessing one or more bounding boxes of the query collection, wherein the one or more bounding boxes include a bounding box for each boundary line segment of each polygon in the collection, a bounding box for each line segment of a line in the collection, and a bounding box of each point in the collection;
    determining a first spatial relationship between MBR of the test object and the query collection by searching the IMR-tree with the MBR of the test object;
    adjusting values in a 9-intersection matrix to describe the first spatial relationship, wherein the values of the matrix describes intersections of any feature of the test object with the boundary, the interior, or the exterior of the query collection;
    if the first spatial relationship does not specify the requested description:
        determining a second spatial relationship between the test object and the query collection by searching the IMR-tree using the test object; and
        adjusting values in the 9-intersection matrix to describe the second spatial relationship;

returning the 9-intersection matrix as an answer to the query;
wherein the method is performed by one or more computing devices.

44. The method of claim 43,
wherein the MBR of the test object is a non-leaf MBR, which has one or more descendent MBRs; and
wherein determining a first spatial relationship includes determining whether any of the one or more descendant MBRs of the non-leaf MBR is inside any polygon of the query collection, or intersects the query collection.

45. The method of claim 43,
wherein the MBR of the test object is a leaf MBR; and
wherein determining an approximate spatial relationship includes determining whether the leaf MBR is inside any polygon of the query collection, or intersects the query collection.

46. The method of claim 43,
wherein the MBR of the test object is a leaf MBR; and
wherein the leaf MBR has four boundary edges or six boundary faces; and
wherein determining a first spatial relationship includes determining whether each of the four boundary edges or the six boundary faces is inside any polygon of the query collection, or intersects the query collection.

47. The method of claim 43,
wherein the test object is a line segment having endpoints; and
wherein determining a refined spatial relationship includes determining whether the line segment test object intersects any object in the query collection.

48. The method of claim 43,
wherein the test object is a polygon; and
wherein determining a refined spatial relationship includes determining whether line segments of the test object polygon intersect any object in the query collection.

49. A non-transitory computer readable medium carrying one or more sequences of instructions for processing queries of spatial objects, wherein execution of the one or more sequences of instructions by one or more processors causes the one or more processors to perform:
receiving a query requesting a description of a spatial relationship between a query collection of spatial objects and a test object;
obtaining the query collection of spatial objects, wherein the spatial objects include points, lines, and polygons, wherein the lines and polygons are defined by one or more line segments, and wherein the query collection has a boundary, an interior, and an exterior; and
obtaining a minimum bounding box MBR containing the test object, the test object having one or more features including one or more of a boundary, exterior, or interior;
obtaining an IMR-tree for accessing one or more bounding boxes of the query collection,
wherein the one or more bounding boxes include a bounding box for each boundary line segment of each polygon in the collection, a bounding box for each line segment of a line in the collection, and a bounding box of each point in the collection;
determining a first spatial relationship between MBR of the test object and the query collection by searching the IMR-tree with the MBR of the test object;
adjusting values in a 9-intersection matrix to describe the first spatial relationship,
wherein the values of the matrix describes intersections of any feature of the test object with the boundary, the interior, or the exterior of the query collection;
if the first spatial relationship does not specify the requested description:
determining a second spatial relationship between the test object and the query collection by searching the IMR-tree using the test object; and
adjusting values in the 9-intersection matrix to describe the second spatial relationship;
returning the 9-intersection matrix as an answer to the query.

50. The non-transitory computer readable medium of claim 49,
wherein the MBR of the test object is a non-leaf MBR, which has one or more descendent MBRs; and
wherein determining a first spatial relationship includes determining whether any of the one or more descendant MBRs of the non-leaf MBR is inside any polygon of the query collection, or intersects the query collection.

51. The non-transitory computer readable medium of claim 49,
wherein the MBR of the test object is a leaf MBR; and
wherein determining an approximate spatial relationship includes determining whether the leaf MBR is inside any polygon of the query collection, or intersects the query collection.

52. The non-transitory computer readable medium of claim 49,
wherein the MBR of the test object is a leaf MBR; and
wherein the leaf MBR has four boundary edges or six boundary faces; and
wherein determining a first spatial relationship includes determining whether each of the four boundary edges or the six boundary faces is inside any polygon of the query collection, or intersects the query collection.

53. The non-transitory computer readable medium of claim 49,
wherein the test object is a line segment having endpoints; and
wherein determining a refined spatial relationship includes determining whether the line segment test object intersects any object in the query collection.

54. The non-transitory computer readable medium of claim 49,
wherein the test object is a polygon; and
wherein determining a refined spatial relationship includes determining whether line segments of the test object polygon intersect any object in the query collection.

* * * * *

UNITED STATES PATENT AND TRADEMARK OFFICE
CERTIFICATE OF CORRECTION

| | | |
|---|---|---|
| PATENT NO. | : 9,104,770 B2 | Page 1 of 1 |
| APPLICATION NO. | : 13/780990 | |
| DATED | : August 11, 2015 | |
| INVENTOR(S) | : Hu et al. | |

It is certified that error appears in the above-identified patent and that said Letters Patent is hereby corrected as shown below:

In the specification,
In column 1, line 16, delete "surface" and insert -- surface. --, therefor.
In the claims,
In column 22, lines 18-19, in Claim 18, delete "claim 13," and insert -- claim 17, --, therefor.

Signed and Sealed this
First Day of March, 2016

Michelle K. Lee
*Director of the United States Patent and Trademark Office*